(12) United States Patent
Brizius

(10) Patent No.: US 9,057,007 B2
(45) Date of Patent: Jun. 16, 2015

(54) STARCH-BASED ADHESIVES

(75) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 145 days.

(21) Appl. No.: 13/819,889

(22) PCT Filed: Jul. 20, 2012

(86) PCT No.: PCT/US2012/047511
§ 371 (c)(1),
(2), (4) Date: Feb. 28, 2013

(87) PCT Pub. No.: WO2014/014472
PCT Pub. Date: Jan. 23, 2014

(65) Prior Publication Data
US 2014/0020597 A1    Jan. 23, 2014

(51) Int. Cl.
*C09J 197/00* (2006.01)
*C09J 103/04* (2006.01)
*C08L 3/00* (2006.01)
*C09D 5/16* (2006.01)

(52) U.S. Cl.
CPC ............ *C09J 197/005* (2013.01); *C09J 103/04* (2013.01)

(58) Field of Classification Search
CPC ............................ C09J 197/005; C09J 103/04
USPC .................... 523/122; 524/47, 48; 106/18.32; 530/505; 536/106
See application file for complete search history.

(56) References Cited

U.S. PATENT DOCUMENTS

| | | | |
|---|---|---|---|
| 3,607,395 | A | 9/1971 | Stephenson |
| 4,608,111 | A | 8/1986 | Hume, III et al. |
| 4,702,496 | A | 10/1987 | Hume, III |
| 6,613,152 | B1 | 9/2003 | Maas et al. |
| 7,714,124 | B2 | 5/2010 | Scheibel et al. |
| 7,959,765 | B2 | 6/2011 | Argyropoulos |
| 8,382,889 | B1 * | 2/2013 | Brizius ...................... 106/205.1 |
| 8,629,266 | B2 * | 1/2014 | Brizius ........................ 536/120 |
| 2005/0255251 | A1 | 11/2005 | Hodge et al. |
| 2011/0217544 | A1 | 9/2011 | Young et al. |

FOREIGN PATENT DOCUMENTS

WO    WO 98/31761 A1    7/1998

OTHER PUBLICATIONS

International Search Report and Written Opinion for PCT/US2012/047511 dated Sep. 28, 2012.
Association of European Adhesives and Sealants Manufacturers, http://www.feica.com (Printed from Internet Dec. 4, 2012).
Baumberger et al., Use of kraft lignin as filler for starch films, *Polymer Degradation and Stability*, (Jan. 1998) 59(1-3):273-277 (Abstract).
Baumberger et al., Utilization of Pine Kraft Lignin in Starch Composites: Impact of Structural Heterogeneity, *J. Agric. and Food Chem.*, (May 15, 1998) 46(6):2234-2240 (Abstract).
Bharat Books Bureau, One Stop Shop for Business Information, http://www.bharatbook.com (Printed from Internet Dec. 4, 2012).
Biofuels Basics, Learning About Renewable Energy http://www.nrel.gov/learning/re_biofuels.html (Printed from Internet Dec. 11, 2012).
Black, Low-Emitting Green Adhesives Bring Improvement to Indoor Air Quality, Adhesives & Sealants Industry (May 1, 2009).
Blair et al., Mortality Among Industrial Workers Exposed to Formaldehyde, *Journal of the National Cancer Institute*, (1986) 76(6):1071-1084 (Abstract).
Block, Disinfection, sterilization, and preservation, 5$^{th}$ Edition, Lippincott Williams and Wilkins. (2001).
CWC Grout: Technical Bulletin # 1020B, http://www.cwcgrout.com/CWC_TechBulletins/TB_1020B_5020ARInd.pdf (Printed from Internet Feb. 28, 2013).
Deepwater Horizon Oil Spill, http://en.wikipedia.org/wiki/Deepwater_Horizon_oil_spill (Printed from Internet Apr. 30, 2012).
Dextrin Adhesives, http://www.dextrinadhesives.com (Printed from Internet Jan. 19, 2012).
Diaz et al., Click chemistry in materials synthesis. 1. Adhesive polymers from copper-catalyzed azide-alkyne cycloaddition, *J. Plym. Sci. A. Plym. Chem.* (Jul. 28, 2004), 42(17):4392-4403 (Abstract).
Ding et al., A highly efficient and selective synthesis of 1, 2, 3-triazole linked saccharide nucleosides via "click chemistry"., *Nucleosides Nucleotides Nucleic Acids* (Apr. 2008) 27(4):368-75 (Abstract).
Eggeling, Lignin—an exceptional biopolymer . . . and a rich resource?, *Trends in Biotechnology*, (Sep.-Oct. 1983) 1(4):123-127 (Abstract).
Fan et al., High-Affinity Pentavalent Ligands of *Escherichia coli* Heat-Labile Entertoxin by Modular Structure-Based Design, *Journal of American Chemical Society*, (Mar. 3, 2000) 122(11):2263-2664 (Abstract).
Feldman et al., Lignin-polymer systems and some applications, *Progress in Polymer Science*, (1986) 12(4):271-276 (Abstract).
Fernandez-Megia et al., A Click Approach to Unprotected Glycodendrimers, *Macromolecules* (Feb. 10, 2006) 36(6):2113-2120 (Abstract).
Finnegan et al., The sick building syndrome: prevalence studies, *Br Med J (Clin Res Ed)*, (Dec. 8, 1984) 289:1573 (Abstract).
Global Adhesive Market, http://answers.google.com/answers/thredview/id/60487.html (Printed from Internet Nov. 28, 2012).
Graf, Benzalkonium chloride as a preservative in nasal solutions: re-examining the data, *Respir Med*, (Sep. 1995) 9:728-733 (Abstract).
Haars et al., Room-Temperature Curing Adhesives Based on Lignin and Phenoloxidases, *ACS Symposium Series*, (Dec. 31, 1989) 385:126-134 (Abstract).
Helms et al., Dendronized Linear Polymers via "Click Chemistry", *Journal of American Chemical Society*, (Oct. 28, 2004) 126(46):15020-15021 (Abstract).
Holladay et al., Top Value-Added Chemicals from Biomass, vol. II—Results of Screening for Potential Candidates from Biorefinery Lignin, Pacific Northwest National Laboratory, Prepared for the U.S. Department of Energy (Oct. 2007), pp. 1-79.

(Continued)

*Primary Examiner* — Kriellion Sanders
(74) *Attorney, Agent, or Firm* — Pepper Hamilton LLP

(57) ABSTRACT

Disclosed are starch-based cross-linked phenolic heteropolymer compositions and methods of synthesizing starch-based cross-linked phenolic heteropolymer compositions as well as their use as adhesives or adhesive additives.

24 Claims, No Drawings

(56) References Cited

OTHER PUBLICATIONS

Huntsman: global manufacturer and marketer of differentiated chemicals. http://www.huntsman.com/corporate/Applications/itemrenderer?p_item_id=241466096&p_item_caid=1123 (Printed from Internet Feb. 28, 2013).

ITW CWC, Industrial Heavy Machinery Epoxy Grouting Systems, http://www.cwcgrout.com/ITW_CWC_products.html (Printed from Internet Feb. 28, 2013).

Jiang et al., A Practical Method for N-Methylation of Indoles Using Dimethyl Carbonate, *Org. Proc. Res. Dev.*, (Nov. 16, 2001) 5(6):604-608 (Abstract).

Kerns et al., Carcinogenicity of Formaldehyde in Rats and Mice after Long-Term Inhalation Exposure, *Cancer Research*, (Sep. 1983) 43::4382 (Abstract).

Kim et al., Effects of formaldehyde on the expression of adhesion molecules in nasal microvascular endothelial cells: the role of formaldehyde in the pathogenesis of sick building syndrome, *Clinical & Experimental Allergy*, (Feb. 2002) 32(2):287-295 (Abstract).

Kitov et al., Shiga-like toxins are neutralized by tailored multivalent carbohydrate ligands, *Nature*, (Feb. 10, 2000) 403:669-672 (Abstract).

Kolb et al., Cheminform Abstract: Click Chemistry: Diverse Chemical Functions from a Few Good Reactions, *Cheminform*, (Aug. 28, 2001) 32(35) (Abstract).

Larock, Comprehensive Organic Transformations, 2nd Edition, Wiley-VCH. (Nov. 3, 1999).

Laser Focus World, Multimodal Nonlinear Optical Imaging, http://www.laserfocusworld.com/whitepapers/2012/01/semrockinc.html (Printed from Internet Jan. 19, 2012).

Lenntech—Biocides, http://lenntech.com/biocides.htm#Quaternary%20ammonium@20salts (Printed form the Internet Jan. 11, 2013).

Link et al., Cell Surface Labeling of *Escherichia coli* via Copper(I)-Catalyzed [3+2] Cycloaddition, *J. Am. Chem. Soc.*, (Aug. 23, 2003) 125(37):11164-11165 (Abstract).

Marple et al., Safety review of benzalkonium chloride used as a preservative in intranasal solutions: an overview of conflicting data and opinions, *Otolaryngol Head Neck Surg.*, (Jan. 2004) 130(1):131-141 (Abstract).

Materials Safety Data Sheet Dimethyl carbonate MSDS, http://www.sciencelab.com/msds.php?msdsId=9923808 (Oct. 9, 2005).

Materials Safety Data Sheet Dimethyl sulfate MSDS, http://www.sciencelab.com/msds.php?msdsId=9927524 (Oct. 11, 2005).

Materials Safety Data Sheet Methyl iodide MSDS, http://www.sciencelab.com/msds.php?msdsId=9927669 (Oct. 11, 2005).

Materials Safety Data Sheet Formaldehyde Solution, Reagnt, ACS MSDS, http://www.sciencelab.com/msds.phd?msdsId=9924094 (Oct. 9, 2005).

Materials Safety Data Sheet Melamine MSDS, http://www.sciencelab.com/msds.php?msdsId=9924600 (Oct. 9, 2005).

Nagahori et al., Tailored Glycopolymers: Controlling the Carbohydrate-Protein Interaction Based on Template Effect, *BioMacromolecules*, (Dec. 28, 2000) 2(1):22-24 (Abstract).

Oil-Price.net, Crude Oil and Commodity Prices, http://www.oil-price.net (Printed from Internet Apr. 30, 2012).

Parrish et al., PEG- and Peptide-Grafted Aliphatic Polyesters by Click Chemistry, *Journal of American Chemical Society*, (Apr. 29, 2005) 127(20):7404-7410 (Abstract).

Petrie, Starch and Dextrin Based Adhesives, SpecialChem (May 12, 2004).

Punna et al., Head-to-Tail Peptide Cyclodimerization by Copper-Catalyzed Azide-Alkyne Cycloaddition, *Angew. Chem. Int. Ed.* (Feb. 3, 2005) 44(15):2215-2220(Abstract).

Qin et al., Click Polymerization: Progresses, Challenges, and Opportunities, *Macromolecules*, (Sep. 28, 2010),43(21):8693-8702 (Abstract).

Ren et al, Synthesis of targetable cationic amphiphiles, *Tetrahedron Letters*, (Oct. 22, 1999), 40(43):7621-7625.

Rodionov et al., Mechanism of the Ligand-Free $Cu^1$-Catalyzed Azide-Alkyne Cycloaddition Reaction, *Angewandet Chemie, Int. Ed.* (Feb. 3, 2005) 44(15):2210-2215 (Abstract).

Rosen et al., Surfactants and Interfacial Phenomena, Wiley $4^{th}$ Edition (Mar. 6, 2012).

Rostovtsev et al., A Stepwise Huisgen Cycloaddition Process: Copper (I)-Catalyzed Regioselective "Ligation" of Azides and Terminal Alkynes, *Angewandet Chemie, Int. Ed.* (Jul. 15, 2002) 41(14):2596-2599 (Abstract).

Seeing the forest through the trees, Adhesives & "Green", http://www.cpadhesives.com/green-adhesives (Printed from Internet Jan. 15, 2013).

Shieh et al., Nucleophilic Catralysis with 1, 8-Diazabicyclo[5.4.0]undec-7-ene (DBU) for the Esterification of Carboxylic Acids with Dimethyl Carbonate, *Journal of Organic Chemistry*, (Mar. 1, 2002) 67(7):2188-2191.

Softwood lignin fragment, http://sci.waikato.ac.nz/farm/images/lignin%20structure%2ORF.jpg (Printed from Internet Jan. 10, 2013).

Soy Inks and Adhesives: Cost Savings and Environmental Assurance, http://soynewuses.org/printing-inks-adhesives/ (Printed from Internet Nov. 28, 2012).

Speers et al., Activity-Based Protein Profiling in Vivo Using a Copper(1)-Catalyzed Azide-Alkyne [3+2] Cycloaddition, *Journal of American Chemical Society*, (Mar. 28, 2003) 125(16):4686-4687 (Abstract).

Stewart, Lignin as a base material for materials applications: Chemistry, application and economics, *Industrial Crops and Products*, (Mar. 2008) 27(2):202-207.

Tietze et al., Ortho-Carboranyl Glycosides of Glucose, Mannose, Maltose and Lactose for Cancer Treatment by Boron Neutron-Capture Therpay, *Chem. Euro. J.*, (Jul. 10, 1998) 4(7):1179-1183 (Abstract).

Tornoe et al., Peptidotriazoles on Solid Phase: [1, 2, 3]-Triazoles by Regiospecific Copper(1)-Catalyzed 1,3-Dipolar Cycloadditions of Terminal Alkynes to Azides, *Journal of Organic Chemistry*, (Apr. 2, 2002) 67(9):3057-3064 (Abstract).

Tundo et al., The Chemistry of Dimethyl Carbonate, *Acc. Chem. Res.* (Jun. 5, 2002) 35(9):706-716.

Uchiyama et al., Per-O-Trimethylsilyl-a-L-Fucopyranosyl Iodide: A Novel Glycosylating Agent for Terminal a-L-Fucosylation, Synlett, (1996) 6:499-501.

Vengal et al., Processing and Study of Novel Lignin-Starch and Lignin-Gelatin Biodegradable Polymeric Films, *Trend Biomater. Artif, Organs,* (2005) 18(2):237-241.

Volatile Organic Compounds, An Introduction to Indoor Air Quality (IAQ), http://www.epa.gov/iaq/voc.html (Printed from Internet Dec. 11, 2012).

Volatile Organic Compounds, Health Effects Fact Sheet, Colorado Department of Public Health and Environment (Nov. 2000).

Wong, Carbohydrate-based Drug Discovery, $1^{st}$ Edition, Wiley-VCH (Oct. 17, 2003).

Wu et al., Green composite films prepared from cellulose, starch and lignin in room-temperature ionic liquid, *Bioresource Technology* (May 2009), 100(9):2569-2574 (Abstract).

* cited by examiner

STARCH-BASED ADHESIVES

CROSS REFERENCE TO RELATED APPLICATIONS

This application is a U.S. national stage filing under 35 U.S.C. §371 of International Application No. PCT/US2012/047511 filed Jul. 20, 2012 entitled "Starch-Based Adhesives," the disclosure of which is incorporated by reference.

BACKGROUND

Modern society is extremely dependent on a steady supply of adhesives. Adhesives are used in many non-food consumer products, including books, fabricated building materials, apparel and house wares. With such widespread distribution and usage, the health effects of consumers' exposure to these adhesive formulations should be considered. Many currently available adhesive products use petroleum-based starting materials and require organic solvents. As these adhesives cure, the organic solvents are released in the form of potentially harmful or irritating volatile organic compounds (VOCs). VOCs can be harmful to human and animal health, and are a significant cause of indoor air and outdoor water supply pollution.

Many commonly used adhesives are of petroleum-derived feedstock molecules such formaldehyde, phenol, and methylene diisocyanate. These chemicals are both toxic to humans and animals and are volatile, easily making their way into the air, thus contributing to indoor air pollution. Formaldehyde, for example is classified as a carcinogen. Furthermore, petroleum-based adhesives often require solvents for distribution. Examples of these solvents include methylene chloride, toluene, and trichloroethane. Water-based (water soluble) adhesives represent an attractive alternative to petroleum-based adhesives, as water is inherently nontoxic, non-flammable, and safe to handle. Moreover, preparation of such an adhesive can be derived almost entirely from natural/renewable sources that do not produce VOCs upon curing.

One such class of water-based adhesives is dextrin-based adhesives. Dextrins are low molecular weight carbohydrates that are readily produced via hydrolysis of plant starch. This is achieved by dry roasting starch in the presence of an acid catalyst. Corn starch is the most commonly used starch due to its abundance and low cost. Potato, tapioca, and sago starches are other substrates that can be easily converted to dextrin. More specifically, dextrins are oligomers of D-glucose linked by either $\alpha$-(1,4) or $\alpha$-(1,6) glycosidic bonds. Given that these adhesives are water soluble they can therefore be distributed as water-based solutions. The majority of starch-based adhesives are used in the paper and textile industries as binders and sizing materials as well as glues and pastes.

Dextrins fall into three classes: white dextrins, yellow dextrins, and British gums. These classes are differentiated by their respective dry roasting times, temperatures, and amounts of catalyst used. British gums are typically dry roasted for 10 to 24 hours at temperatures between 150° C. and 180° C. in the presence of small amounts of acid catalyst. British gums are the highest molecular weight dextrin fragments, and as such they typically form the strongest adhesives. British gums contain pendant hydroxyl groups which form an extended network of inter- and intramolecular hydrogen bonds, thus producing a strong adhesive force. However, the extensive hydrogen bonding network makes these longer fragments of British gum dextrins less soluble in water because the crystalline hydrogen-bonded domains are difficult to separate and dissolve. Because of this, the maximum solids concentration of British gum dextrin fragments in the water solvent carrier is only about 25% (w/v), thus limiting the utility of these starch-based dextrin adhesives. In addition, these types of adhesives are susceptible to colonization by a variety of microbes including molds and fungi which can decrease the effective lifetime of the adhesive and the product into which it is incorporated.

Accordingly, there is a need for improved environmentally friendly adhesives and adhesive additives that improve the properties of existing starch-based adhesives.

SUMMARY

Presently disclosed are compositions and methods directed to environmentally friendly, starch-based adhesives with improved properties and adhesive additives which improve the properties of existing starch-based adhesives.

Some embodiments are directed to compositions comprising: a starch-based cross-linked phenolic heteropolymer; a plurality of antimicrobial agents covalently bound to the starch-based cross-linked phenolic heteropolymer; and a plurality of sugar units covalently bound to the starch-based cross-linked phenolic heteropolymer.

Some embodiments are directed to modified starch-based adhesives comprising: a starch-based adhesive and an additive, the additive consisting of a starch-based composition comprising a starch-based cross-linked phenolic heteropolymer; a plurality of antimicrobial agents covalently bound to the starch-based cross-linked phenolic heteropolymer; and a plurality of sugar units covalently bound to the starch-based cross-linked phenolic heteropolymer.

Some embodiments are directed to methods for synthesizing an adhesive, the method comprising: dissolving a starch-based cross-linked phenolic heteropolymer in a non-protic polar solvent to form a dissolved starch-based cross-linked phenolic heteropolymer; contacting azide terminated poly (ethylene glycol) and a plurality of hydroxyl-terminated antimicrobial agents with the dissolved starch-based cross-linked phenolic heteropolymer to form an adhesive intermediate wherein the plurality of antimicrobial agents are covalently bound to the dissolved starch-based cross-linked phenolic heteropolymer; and contacting a plurality of alkynylated sugar units with the adhesive intermediate to form the adhesive wherein the plurality of sugar units are covalently bound to the adhesive intermediate.

Some embodiments are directed to methods of improving the physical characteristics of a starch-based adhesive, the method comprising combining a starch-based adhesive with an additive wherein the additive comprises a starch-based cross-linked phenolic heteropolymer comprising: a plurality of pendent hydroxyl groups of formula —OH and a plurality of pendent carboxylic acid groups of formula —C(=O)OH; and a plurality of antimicrobial agents and sugar units covalently bound to the plurality of pendent hydroxyl groups and carboxylic acid groups.

DETAILED DESCRIPTION

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figure, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various compositions, methods and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a", "an", or "the" limits any particular claim containing such introduced claim recitation to embodiments containing only one such recitation, even when the same claim includes the introductory phrases "one or more" or "at least one" and indefinite articles such as "a", "an", or "the" (e.g., "a" and/or "an" and/or "the" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

As used herein, A "heteropolymer" is intended to mean a polymer made up of diverse monomer units bound to together. In some embodiments, a heteropolymer comprises a plurality of pendent phenolic alcohol groups, a plurality of pendent carboxylic acid groups, a plurality of pendent methoxy groups, or a combination thereof. In some embodiments, the heteropolymer is a polymer that is derived from a living organism. In some embodiments, the heteropolymer can be extracted from a natural source. In some embodiments, the heteropolymer is lignin, cellulose, hemicellulose, dextrin, a wood-derived biopolymer, or a combination thereof. In further embodiments, the heteropolymer is lignin, lignosulfonate, or a combination thereof.

As used herein, "pressure sensitive" refers to a feature of an adhesive wherein the application of pressure may result in the formation of bonds within the adhesive itself, between the adhesive and one or more surfaces to be adhered to, or a combination thereof. In some embodiments, the bonds formed within the adhesive, between the adhesive and the surface, or a combination thereof comprise Van De Waals bonds, hydrogen bonding, ionic bonding, electrostatic interactions, or combinations thereof. In some embodiments, no further activating agents such as chemical reagents, heat, or light are necessary. In some embodiments, the amount of pressure applied is positively correlated to the adhesive force of a pressure sensitive adhesive. In some embodiments, a pressure sensitive adhesive may wet the surface to which it is applied. In yet other embodiments, pressure sensitive adhesives exhibit resistance to flow when stress is applied.

A composition with the ability to disrupt the crystalline hydrogen bonding network so as to increase solubility of the adhesive as well as conferring antimicrobial properties to the adhesive would provide a highly desirable additive for a water-based adhesive otherwise lacking these properties. The embodiments described herein provide adhesives and adhesive additives with antimicrobial properties capable of increasing adhesive solubility for multiple applications.

Such compositions, when added to a starch-based adhesive in small amounts, may impart a variety of desirable properties such as, for example, antimicrobial properties and increased water solubility in a single additive component. Further embodiments include methods for the synthesis of adhesives, additives, as well as additive-adhesive mixtures.

Properties such as viscosity, solids content, stability, tack, slip, substrate penetration, drying rate, flexibility, water and microbial resistance, and cost are largely determined by the type of adhesive used; however, certain properties can be modulated by providing additive compositions to adhesives. In some embodiments, additive compositions include compositions that confer a property on an adhesive by insertion into the adhesive and thereby becoming an integral part of the cured adhesive.

Embodiments herein are directed to a composition comprising: a starch-based cross-linked phenolic heteropolymer; a plurality of antimicrobial agents covalently bound to the starch-based cross-linked phenolic heteropolymer; and a plurality of sugar units covalently bound to the starch-based cross-linked phenolic heteropolymer.

In some embodiments, the starch-based cross-linked phenolic heteropolymer is a sulfonated starch-based cross-linked phenolic heteropolymer. In some embodiments, the sulfonated starch-based cross-linked phenolic heteropolymer is selected from sulfonated lignin, sulfonated cellulose, sulfonated hemicellulose, sulfonated dextrin, a sulfonated wood-derived cross-linked phenolic heteropolymer, or a combination thereof. In some embodiments, the starch-based cross-linked phenolic heteropolymer is selected from lignin, cellulose, hemicellulose, dextrin, a wood-derived cross-linked phenolic heteropolymer, or a combination thereof.

In some embodiments, the wood-derived polymer can be a substance derived from wood such as wood pulp, refined wood pulp, lignin derivatives, wood rosin, rosin cellulose, modified rosin, rosin gum salts, rosin derivatives, or combinations thereof.

In some embodiments, the starch-based cross-linked phenolic heteropolymer is selected from lignin, sulfonated lignin, or a combination thereof.

The biofuel and paper industries produce large amounts of biomass waste in the form of five and six carbon sugars as well as vast amounts of waste products such as lignin. Lignin is a highly cross-linked, heavily aromatic polymeric product that has little value to these industries, and as such is treated as a waste material. Lignin represents an inexpensive biopolymer that is rich with functional groups made up of phenols and primary and secondary alcohols, as seen in the exemplary generic lignin structure below:

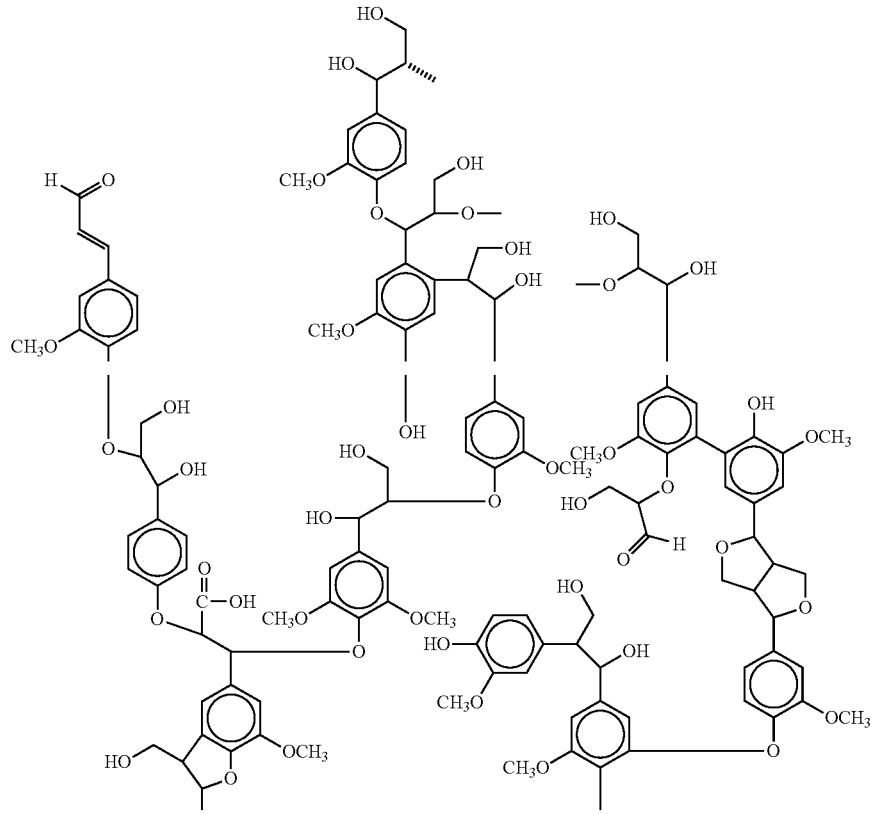

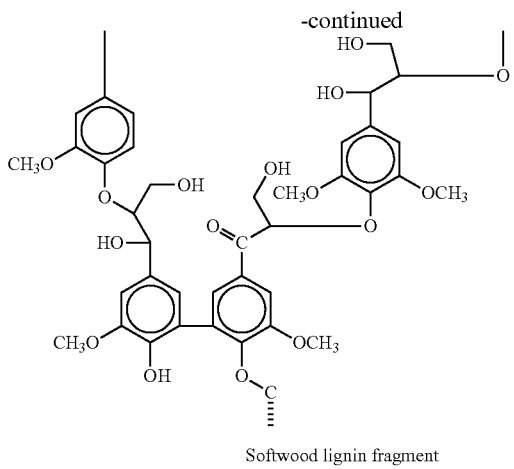

Softwood lignin fragment

Lignosulfonates which include sulfonated lignin are water-soluble byproducts of sulfite pulping, a treatment step during the production of paper, and are common in the wood industry. In some embodiments, lignosulfonates are also soluble in organic solvents, such as, but not limited to, dimethyl formamide and dimethyl sulfoxide. During the process of sulfite pulping, an acid source cleaves a percentage of the lignin's aromatic ether bonds. The acid cleavage of lignin to form carbocation intermediates and their subsequent reaction with bisulfite ions ($HSO_3^-$) to form sulfonated lignin is shown below wherein R is selected from —H, —OH, and —$CH_3$ or another sulfonated lignin subunit:

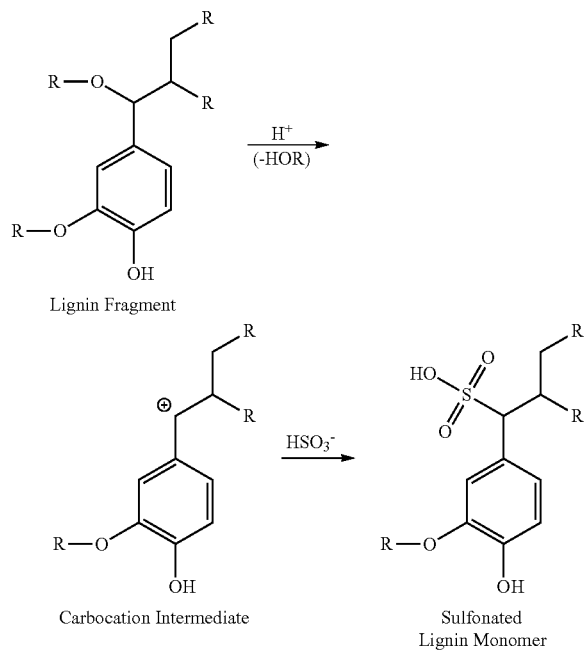

In some embodiments, sulfonation occurs solely on the side chains, not on the aromatic rings, due to the nature of the above substitution reaction. In some embodiments, the resulting lignosulfonates can have very polydisperse distributions of molecular weight, ranging from 1 k to 140 k Daltons.

In some embodiments, the compositions can include antimicrobial agents capable of conferring antimicrobial properties. In some embodiments, compositions comprising a plurality of antimicrobial agents are themselves adhesives. In these embodiments, the adhesive is more resistant to growth than the same adhesive in the absence of the additive of at least one or more of the following: mold, fungus, bacteria, and combinations thereof. In yet other embodiments, the compositions described herein represent additives that may be combined with starch based adhesives. In these embodiments, the combination of the additive with an adhesive to form an additive containing adhesive results in the adhesive becoming more resistant to growth than the same adhesive in the absence of the additive of at least one or more of the following: mold, fungus, bacteria, and combinations thereof. Embodiments are not limited to a particular type of antimicrobial agent. For example, the antimicrobial agents may provide anti-bacterial, anti-viral, anti-fungal, anti-mold activities, and the like and combinations thereof.

In some embodiments, the starch-based cross-linked phenolic heteropolymer comprises a plurality of pendent hydroxyl groups of formula —OH and a plurality of pendent carboxylic acid groups of formula —C(=O)OH and wherein the plurality of antimicrobial agents is covalently bound to about 1% to about 5% of the combination of the plurality of pendent hydroxyl groups and the plurality of pendent carboxylic acid groups.

In some embodiments, the plurality of antimicrobial agents is covalently bound to about 1% to about 2%, about 2% to about 3%, about 3% to about 4%, about 4% to about 5%, about 1% to about 3%, or about 1% to about 4% of the combination of the plurality of pendent hydroxyl groups and the plurality of pendent carboxylic acid groups.

In some embodiments, the starch-based cross-linked phenolic heteropolymer comprises a plurality of pendent hydroxyl groups of formula —OH and a plurality of pendent carboxylic acid groups of formula —C(=O)OH and wherein the plurality of antimicrobial agents is covalently bound to about 5% to about 10% of the combination of the plurality of pendent hydroxyl groups and the plurality of pendent carboxylic acid groups.

In some embodiments, the plurality of antimicrobial agents is covalently bound to about 5% to about 6%, about 6% to about 7%, about 7% to about 8%, about 8% to about 9%, about 9% to about 10%, about 5% to about 7%, about 1% to about 2%, about 5% to about 8%, about 5% to about 9%, or about 1% to about 10% of the combination of the plurality of pendent hydroxyl groups and the plurality of pendent carboxylic acid groups.

In some embodiments, the starch-based cross-linked phenolic heteropolymer comprises a plurality of pendent hydroxyl groups of formula —OH and a plurality of pendent carboxylic acid groups of formula —C(=O)OH and wherein the plurality of antimicrobial agents is covalently bound to about 1% to about 50% of the combination of the plurality of pendent hydroxyl groups and the plurality of pendent carboxylic acid groups.

In some embodiments, the plurality of antimicrobial agents is covalently bound to about 1% to about 10%, about 10% to about 20%, about 20% to about 30%, about 30% to about 40%, about 40% to about 50%, about 1% to about 20%, about 1% to about 30%, or about 1% to about 40% of the combination of the plurality of pendent hydroxyl groups and the plurality of pendent carboxylic acid groups.

In some embodiments, the plurality of antimicrobial agents comprises at least one or more of the following: a phenol, a quaternary ammonium salt, 4-hydroxybenzoic acid, a hydroxytyrosol, an alkyl ester of gallic acid, an amino acid, a peptide, or combinations thereof.

In some embodiments, the antimicrobial agent can be a phenol or polyphenol. Phenols or polyphenols may offer microbial resistance when present in an additive compositions or adhesive compositions described herein. Examples of phenol and polyphenol units include gallic acid, modified forms of gallic acid including alkyl esters of gallic acid, and combinations thereof.

In other embodiments, the antimicrobial agent can be an O-alkyl quaternary ammonium salt such as, but not limited to, benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, and combinations thereof.

In some embodiments, the plurality of antimicrobial agents comprise a quaternary ammonium salt having a structure of the formula —O-alkyl-$NR^1R^2R^3X$, wherein $R^1$-$R^3$ are alkyl chains, and wherein X is a counterion. In some embodiments, the counterion comprises a chloride, a fluoride, a bromide, an iodide, an astatide, a sulfate, a tosylate, a mesylate, or a combination thereof.

In still other embodiments, the antimicrobial agent can be an organic acid. In yet other embodiments, the antimicrobial agent can be 4-hydroxybenzoic acid a hydroxytyrosol or a combination thereof. In some embodiments the additive can include more than one particular antimicrobial agent.

While not wishing to be bound by theory, at the molecular level, the quaternary ammonium salts may exert antimicrobial actions via disruption of intermolecular interactions in the lipid bilayers that make up bacterial cell membranes. This results in loss of structural integrity, loss of permeability controls, and in some embodiments, loss of cellular contents thus resulting in microbial death.

In some embodiments, the amino acid comprises histidine, lysine, serine, glycine, proline, alanine, isoleucine, leucine, phenylalanine, tryptophan, tyrosine, valine, or combinations thereof. In some embodiments, the amino acid is covalently bound to the starch-based cross-linked phenolic heteropolymer via a molecular linker. In some embodiments, the molecular linker is an alkyl chain of formula —$CH_3$—$(CH_2)$—$CH_2$— wherein n is an integer from 0 to 24 and wherein the alkyl chain is covalently bound to a plurality of pendent hydroxyl groups of formula —OH and a plurality of pendent carboxylic acid groups of formula —C(=O)OH on the starch-based cross-linked phenolic heteropolymer forming an alkoxy chain, an ester side chain, or a combination thereof. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, the alkyl chain is a dodecyl straight alkyl chain. In some embodiments, the molecular linker is a polyethylene glycol chain formula —[O—$CH_2$—$CH_2$]$_n$—O— where n is an integer from 2 to 24. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, the amino acid is a modified amino acid wherein at least one amine group is substituted with a quaternary amine of formula —$NR_2MeX$, where R is a straight alkyl chain of formula $CH_3$—$(CH_2)n$-$CH_2$— wherein n is an integer from 0 to 24, Me is a methyl group, and wherein X is a counterion. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, the plurality of antimicrobial agents are covalently bound to the starch-based cross-linked phenolic heteropolymer by a polyethylene glycol chain of formula —[O—$CH_2$—$CH_2$]$_n$—O— where n is an integer from 2 to 18. In some embodiments, n is an integer from 2 to 6, 6 to 12, or 12 to 18, or 2 to 12. Specific examples of n include 1, 2, 3, 4, 5, 6, 7, 8, 9, 10, 11, 12, 13, 14, 15, 16, 17, 18, and ranges between any two of these values.

In some embodiments, compositions described herein may include one or more sugar units that may facilitate insertion of the additive into the adhesive macromolecular structure. Embodiments are not limited to any particular type of sugar as generally any sugar molecule may facilitate insertion into the macromolecular structure of the adhesive. For example, in some embodiments, the sugar unit may be a monomer or oligomer of a hexose sugar. The structure of hexose sugars closely resemble the structure of starch-based adhesive oligomers, and the presence of a sugar unit on the additives of such embodiments may allow the chemical composition to become integrated into adhesive and confer the desired properties to the adhesive.

In some embodiments, the starch-based cross-linked phenolic heteropolymer comprises a plurality of pendent hydroxyl groups of formula —OH and a plurality of pendent carboxylic acid groups of formula —C(=O)OH and wherein the plurality of sugar units is covalently bound to about 10% to about 90% of the combination of the plurality of pendent hydroxyl groups and the plurality of pendent carboxylic acid groups.

In some embodiments the plurality of sugar units is covalently bound to about 10% to about 20%, about 20% to about 30%, about 10% to about 90%, about 30% to about 40%, about 40% to about 50%, about 50% to about 60%, about 70% to about 80%, about 80% to about 90%, about 10% to about 30%, about 10% to about 40%, about 10% to about 50%, about 10% to about 60%, about 10% to about 70%, or about 10% to about 80% of the combination of the plurality of pendent hydroxyl groups and the plurality of pendent carboxylic acid groups. Specific examples include about 10%, about 20%, about 30%, about 40%, about 50%, about 60%, about 70%, about 80%, about 90%, and ranges between any two of these values.

In some embodiments, the plurality of sugar units comprises at least one hexose sugar oligomer wherein multiple hexose sugar oligomers are linked together by either α-(1,4)

or α-(1,6) glycosidic bonds. In some embodiments, the plurality of sugar units comprises at least one of α D-allose, α D-altrose, α D-mannose, α D-glucose, α D-gulose, α D-galactose, α D-idose, α D-talose, β D-allose, β D-altrose, β D-mannose, β D-glucose, β D-gulose, β D-galactose, β D-idose, β D-talose β-D-lactoside, α-L-flucoside, α-D-mannoside, or combinations thereof.

In some embodiments, hexose sugars may also be in the form of oligomers either as a "pure" oligomer including a single species of hexose sugar, or the hexose sugars may be provided as a mixture of hexose sugars linked together by either α-(1,4) or α-(1,6) glycosidic bonds.

In some embodiments, the plurality of sugar units is covalently bound to the starch-based cross-linked phenolic heteropolymer via a polyethylene glycol chain of formula —[O—CH$_2$—CH$_2$]$_n$—O— where n is an integer from 2 to 24. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, the composition is suitable for use as a pressure sensitive adhesive. In some embodiments, the adhesive compositions described herein are suitable for use a pressure sensitive adhesives. In some embodiments, the adhesives described herein have shear strength and tackiness characteristics and properties making them pressure sensitive. In some embodiments, the adhesives described herein are pressure sensitive due to their resistance to shear stress. In some embodiments, the resistance to shear stress results from electrostatic interactions forming within the adhesive. In some embodiments, the electrostatic interactions comprised Van De Waals bonding, hydrogen bonding, or combinations thereof. In some embodiments, the presence of multiple electrostatic interactions, for example, intermolecular hydrogen bonds throughout the adhesive may confer increased adhesive strength, increased resistance to shear stress, or a combination thereof. In some embodiments, the composition is suitable for use as an adhesive additive. In some embodiments, the addition of the adhesive additives described herein may confer desirable characteristics and properties to a starch-based adhesive. In some embodiments the properties or characteristics that may be conferred by an additive expand the range of use of a particular starch-based adhesive.

Some embodiments are directed to a modified starch-based adhesive comprising: a starch-based adhesive and an additive, the additive consisting of a starch-based composition comprising a starch-based cross-linked phenolic heteropolymer; a plurality of antimicrobial agents covalently bound to the starch-based cross-linked phenolic heteropolymer, and a plurality of sugar units covalently bound to the starch-based cross-linked phenolic heteropolymer.

Starch-based dextrin adhesives are a major component of the paper and packaging industries. These adhesives are readily available, inexpensive, and easy to apply in the form of a water-based solution. They have numerous advantages over other types of adhesives including having a low production cost, providing solid adhesion to porous surfaces and oil insolubility, and being readily available, non-toxic, and biodegradable. The manufacture of a generic starch adhesive typically begins by heating the starch in water, which bursts open the starch granules held together by internal hydrogen bonds. This forms a paste, which is used as the adhesive. Normally, where the starch solids concentrations are above 15%, the cooked paste will form an insoluble rubbery mass upon cooling; however, with the proposed additive, much higher loading concentrations are possible. Higher solids concentrations are desirable as currently, the usefulness of dextrin-based adhesives is limited by a maximum solids concentration of approximately 25% w/v. High solids concentrations are related to the strength of the adhesive. As such, dextrin based adhesives form an extended network of inter- and intramolecular hydrogen bonds that are largely responsible for conferring strength to the adhesive. It is generally believed that higher solids concentration in the adhesive results in higher adhesive power of the adhesive. In some embodiments the maximum solids concentrations ranges from, for example, 1-25% w/v, 25-50% w/v, 50-75% w/v, and 75-100% w/v in a given volume of water.

In some embodiments, the maximum solids concentrations will be in excess of 99% w/v, 98% w/v, 97% w/v, 96% w/v, 95% w/v, 90% w/v, 80% w/v, 70% w/v, 60% w/v, 50% w/v, 40% w/v, 30% w/v and 25% w/v. In some embodiments, the additive will confer to the adhesive in a water solvent carrier, a solids concentration of the modified starch-based adhesive in the water solvent carrier is greater than 25% w/v, 30% w/v, 40% w/v, 50% w/v, 60% w/v, 70% w/v, 80% w/v, 90% w/v, 95% w/v, 96% w/v, 97% w/v, 98% w/v and 99% w/v.

In some embodiments, the starch-based adhesive is a yellow dextrin adhesive, a white dextrin adhesive, a British gum adhesive, or a combination thereof.

In some embodiments, upon combination of the additive with a starch-based adhesive to form a modified starch-based adhesive, the modified starch-based adhesive has a water solubility of about 110% to about 200%, about 110% to about 140%, about 140% to about 170%, about 170% to about 200%, about 110% to about 140%, or about 110% to about 170% of the same starch-based adhesive in the absence of the additive.

In some embodiments, upon combination of the additive with a starch-based adhesive to form a modified starch-based adhesive, the modified starch-based adhesive becomes more resistant to growth of at least one of mold, fungus, bacteria, and combinations thereof than a sample of the same starch-based adhesive in the absence of the additive.

In some embodiments, upon combination of the additive with a starch-based adhesive to form a modified starch-based adhesive, and upon curing, the modified starch-based adhesive is more pliable, more resistant to chipping, more resistant to cracking, or more resistant to microbial growth, or combinations thereof, than a cured sample of the same starch-based adhesive in the absence of the starch-based adhesive.

Generally, for British gums, the maximum usable solids content is about 25%. In some embodiments, an additive composition such as those described herein can be added to a powdered-starch-based adhesive such as a dextrin adhesive while the dextrin is still in the liquid (water) phase. Starch-based dextrin adhesives cure by loss of moisture. Upon evaporation of the solvent, which "cures" the adhesive, the additive can act as an internal plasticizer, held in place by its sugar moiety.

In some embodiments, the additives described herein allow for the preparation of a "super-high-solid" dextrin-water adhesive, which decreases both shipping volume/cost as well as the required curing time since less water is required to evaporate. The resulting adhesive retains its strong adhesive character, is flexible, and is resistant microbial colonization.

Some embodiments are directed to a method for synthesizing an adhesive, the method comprising: dissolving a starch-based cross-linked phenolic heteropolymer in a non-protic polar solvent to form a dissolved starch-based cross-linked phenolic heteropolymer; contacting azide terminated poly(ethylene glycol) and a plurality of hydroxyl-terminated antimicrobial agents with the dissolved starch-based cross-linked phenolic heteropolymer to form an adhesive intermediate wherein the plurality of antimicrobial agents are covalently bound to the dissolved starch-based cross-linked phenolic heteropolymer; and contacting a plurality of alkynylated sugar units with the adhesive intermediate to form the adhesive wherein the plurality of sugar units are covalently bound to the adhesive intermediate.

In some embodiments, dissolving a starch-based cross-linked phenolic heteropolymer comprises adding a polar aprotic solvent, a proton sponge, or a combination thereof to the starch-based cross-linked phenolic heteropolymer to form a dissolved starch-based cross-linked phenolic heteropolymer. In some embodiments, the polar aprotic solvent is dimethylsulfoxide, dimethylformamide, dimethylacetamide, N-methyl-2-pyrrolidone, dichloromethane, tetrahydrofuran, ethyl acetate, acetone, acetonitrile, hexamethylphosphoramide, or a combination thereof. In some embodiments, the proton sponge is pyridine, 1,8-bis(dimethylamino)naphthalene, 1,8-bis(hexamethyltriaminophosphazenyl)naphthalene, or a combination thereof.

In some embodiments, the starch-based cross-linked phenolic heteropolymer comprises a plurality of pendent hydroxyl groups of formula —OH and a plurality of pendent carboxylic acid groups of formula —C(=O)OH. In some embodiments, the starch-based cross-linked phenolic heteropolymer is a sulfonated starch-based cross-linked phenolic heteropolymer.

In some embodiments, the sulfonated starch-based cross-linked phenolic heteropolymer is sulfonated lignin, sulfonated cellulose, sulfonated hemicellulose, sulfonated dextrin, a sulfonated wood-derived cross-linked phenolic heteropolymer, or a combination thereof. In some embodiments, the starch-based cross-linked phenolic heteropolymer is lignin, cellulose, hemicellulose, dextrin, a wood-derived cross-linked phenolic heteropolymer, or a combination thereof.

In some embodiments, contacting azide terminated poly(ethylene glycol) and a plurality of antimicrobial agents with the dissolved starch-based cross-linked phenolic heteropolymer further comprises addition of a resin-bound organophosphorous compound and an azodicarboxylate. In some embodiments, the azodicarboxylate is diethyl azodicarboxylate (DEAD), diisopropyl azodicarboxylate (DIAD), N,N,N', N'-tetramethylazodcarboxamide, 1,1'-(azodicarbonyl)dipiperidine, dibenzyl azodicarboxylate, dimethyl azodicarboxylate or a combination thereof. In some embodiments, the resin-bound organophosphorous compound is dicyclohexylphenylphosphine, diethylphenylphosphine, 4-(dimethylamino)phenyldiphenylphosphine, diphenyl-2-pyridylphosphone, isopropyldiphenylphosphine, tributylphosphine, tri-tert-butylphosphine, tricyclohexylphosphine, trihexylphosphine, triphenylphosphine, tri-n-octylphosphine, 4-diphenylphosphine polystyrene resin, 4-diphenylphosphino polystyrene resin, polystyryldipehnylphosphine, or a combination thereof.

In some embodiments, decanting the adhesive intermediate from the resin-bound organophosphorous compound after contacting the dissolved starch-based cross-linked phenolic heteropolymer with the azide terminated poly(ethylene glycol) and a plurality of antimicrobial agents allows the adhesive intermediate to dry, thus forming a powder.

In some embodiments, the plurality of hydroxyl-terminated antimicrobial agents comprises at least one of the following: a phenol, a quaternary ammonium salt, 4-hydroxybenzoic acid, a hydroxytyrosol, an alkyl ester of gallic acid, an amino acid, a peptide, or combinations thereof.

In some embodiments, the plurality of hydroxyl-terminated antimicrobial agents comprise a quaternary ammonium salt having a structure of the formula HO-alkyl-NR$^1$R$^2$R$^3$X, wherein R$^1$-R$^3$ are alkyl chains, and wherein X is a counterion wherein the counterion comprises a chloride, a fluoride, a bromide, an iodide, an astatide, a sulfate, a tosylate, a mesylate, or a combination thereof.

In some embodiments, the amino acid comprises histidine, lysine, serine, glycine, proline, alanine, isoleucine, leucine, phenylalanine, tryptophan, tyrosine, valine, or a combination thereof. In some embodiments, the amino acid is modified to form a quaternary ammonium-containing amino acid prior to contacting with the dissolved starch-based cross-linked phenolic heteropolymer. In some embodiments, the amino acid is modified by contacting the amino acid with dodecyl bromide to form an alkylated amino acid intermediate; wherein at least one alkyl chain is covalently bound to the amino groups on the amino acid. In some embodiments, the alkyl chain is a straight alkyl chain of formula $CH_3$—$(CH_2)_n$—$CH_2$— wherein n is an integer from 0 to 24. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, treating the alkylated amino acid with a methylating agent followed by mild acidic hydrolysis may form a quaternary ammonium containing amino acid wherein the quaternary ammonium group is of formula AA-NR$_2$MeX where AA is a amino acid, R is an straight alkyl chain of formula $CH_3$—$(CH_2)_n$—$CH_2$— wherein n is an integer from 0 to 16, Me is a methyl group and wherein X is a counterion. In some embodiments, the methylating agent is dimethyl carbonate, methyl iodide, methoxy tosylate, methoxy mesylate, methyl bromide, methyl chloride, or a combination thereof. In some embodiments, the counterion is selected from a chloride, a fluoride, a bromide, an iodide, an astatide, a sulfate, a tosylate, a mesylate, or a combination thereof. In some embodiments, n is an integer from 0 to 4, 4 to 8, 8 to 12, 12 to 16, 0 to 8, or 0 to 16. Specific examples of n include 1, 2, 3, 4, 5, 6, 7, 8, 9, 10, 11, 12, 13, 14, 15, 16, and ranges between any two of these values.

In some embodiments, the amino acid is modified by contacting the amino acid with a polyethylene glycol chain to form a pegylated amino acid intermediate; wherein at least one alkyl chain is covalently bound to the amino groups on the amino acid. In some embodiments, the polyethylene glycol chain is of formula $CH_3$—$(CH_2)_m$—$[O$—$CH_2$—$CH_2]_n$—$O$—$(CH_2)_p$—$CH_3$ where n is an integer from 2 to 24 and wherein m and p are independently an integer from 0 to 24. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values. In some embodiments, m and p are independently an integer from 2 to 6, 6 to 12, or 12 to 18, or 2 to 12. Specific examples of n include 1, 2, 3, 4, 5, 6, 7, 8, 9, 10, 11, 12, 13, 14, 15, 16, 17, 18, and ranges between any two of these values.

Some embodiments further comprise treating the pegylated amino acid with a methylating agent followed by mild acidic hydrolysis to form a quaternary ammonium containing amino acid wherein the quaternary ammonium group is of formula AA-NR$_2$MeX where AA is an amino acid, R is a polyethylene glycol chain of formula —$(CH_2)_m$—$[O$—$CH_2$—$CH_2]_n$—$O$—$(CH_2)_p$— wherein n is an integer from 0 to 16, m and p are independently an integer from 0 to 24, Me is a methyl group and wherein X is a counterion. In some embodiments, n is an integer from 0 to 4, 4 to 8, 8 to 12, 12 to 16, 0 to 8, or 0 to 16. Specific examples of n include 1, 2, 3, 4, 5, 6, 7, 8, 9, 10, 11, 12, 13, 14, 15, 16, and ranges between any two of these values. In some embodiments, m and p are independently an integer from 18 to 24. In some embodiments, m and p are independently an integer from 2 to 6, 6 to 12, or 12 to 18, or 2 to 12. Specific examples of n include 1, 2, 3, 4, 5, 6, 7, 8, 9, 10, 11, 12, 13, 14, 15, 16, 17, 18, and ranges between any two of these values.

In some embodiments, the methylating agent is dimethyl carbonate, methyl iodide, methoxy tosylate, methoxy mesylate, methyl bromide, methyl chloride, or a combination thereof. In some embodiments, the counterion is selected from a chloride, a fluoride, a bromide, an iodide, an astatide, a sulfate, a tosylate, a mesylate, or a combination thereof.

In some embodiments, contacting a plurality of alkynylated sugar units with the adhesive intermediate to form the adhesive further comprises the addition of a copper salt, sodium ascorbate, a diluent, or a combination thereof. In some embodiments, the copper salt is copper sulfate. In some embodiments, the diluent comprises a mixture of water and an organic solvent at a ratio of about 1 to 1 by volume.

In some embodiments, contacting the plurality of alkynylated sugar units with the adhesive intermediate to form the adhesive is carried out at ambient temperature. In some embodiments, the plurality of alkynylated sugar units comprises at least one pentose sugar oligomer, one hexose sugar oligomer, or a combination thereof, wherein multiple oligomers are linked together by either α-(1,4) or α-(1,6) glycosidic bonds. In some embodiments, the plurality of alkynylated sugar units comprises β-D-lactoside, α-L-flucoside, α-D-mannoside, or combinations thereof.

In some embodiments, the adhesive formed comprises a starch-based cross-linked phenolic heteropolymer comprising a plurality of pendent hydroxyl groups of formula —OH and a plurality of pendent carboxylic acid groups of formula —C(═O)OH and wherein the plurality of antimicrobial agents and sugar units are covalently bound to the plurality of pendent hydroxyl groups and carboxylic acid groups. In some embodiments, the plurality of antimicrobial agents is covalently bound to about 1% to about 5%, about 5% to about 10%, about 1% to about 2%, about 2% to about 3%, about 3% to about 4%, about 4% to about 5%, about 1% to about 3%, about 1% to about 4%, about 1% to about 50%, about 1% to about 10%, about 10% to about 20%, 20% to about 30%, about 30% to about 40%, about 40% to about 50%, about 1% to about 20%, about 1% to about 30%, or about 1% to about 40% of the combination of the plurality of pendent hydroxyl groups and the plurality of pendent carboxylic acid groups.

In some embodiments, the plurality of sugar units is covalently bound to about 10% to about 90%, about 10% to about 20%, about 20% to about 30%, about 10% to about 90%, about 30% to about 40%, about 40% to about 50%, about 50% to about 60%, about 70% to about 80%, about 80% to about 90%, about 10% to about 30%, about 10% to about 40%, about 10% to about 50%, about 10% to about 60%, about 10% to about 70%, or about 10% to about 80% of the combination of the plurality of pendent hydroxyl groups and the plurality of pendent carboxylic acid groups.

Some embodiments are directed to a method of improving the physical characteristics of a starch-based adhesive, the method comprising combining a starch-based adhesive with an additive wherein the additive comprises a starch-based cross-linked phenolic heteropolymer comprising: a plurality of pendent hydroxyl groups of formula —OH, a plurality of pendent carboxylic acid groups of formula —C(═O)OH; and a plurality of antimicrobial agents and sugar units covalently bound to the plurality of pendent hydroxyl groups and carboxylic acid groups.

In some embodiments, the starch-based cross-linked phenolic heteropolymer is a sulfonated starch-based cross-linked phenolic heteropolymer. In some embodiments, the sulfonated starch-based cross-linked phenolic heteropolymer is sulfonated lignin, sulfonated cellulose, sulfonated hemicellulose, sulfonated dextrin, a sulfonated wood-derived cross-linked phenolic heteropolymer, or a combination thereof. In some embodiments, the starch-based cross-linked phenolic heteropolymer is lignin, cellulose, hemicellulose, dextrin, a wood-derived cross-linked phenolic heteropolymer, or a combination thereof.

In some embodiments, the plurality of antimicrobial agents is covalently bound to about 1% to about 5%, about 1% to about 2%, about 2% to about 3%, about 3% to about 4%, about 4% to about 5%, about 1% to about 3%, about 1% to about 4%, about 5% to about 10%, about 1% to about 10%, about 10% to about 20%, about 20% to about 30%, about 30% to about 40%, about 40% to about 50%, about 1% to about 20%, about 1% to about 30%, about 1% to about 40%, or about 1% to about 50%, of the combination of the plurality of pendent hydroxyl groups and the plurality of pendent carboxylic acid groups.

In some embodiments, the plurality of antimicrobial agents comprises at least one of the following: a phenol, a quaternary ammonium salt, 4-hydroxybenzoic acid, a hydroxytyrosol, an alkyl ester of gallic acid, an amino acid, a peptide, or combinations thereof.

In some embodiments, the plurality of antimicrobial agents comprise a quaternary ammonium salt having a structure of the formula —O-alkyl-NR$^1$R$^2$R$^3$X, wherein R$^1$-R$^3$ are alkyl chains, and wherein X is a counterion. In some embodiments, the counterion comprises a chloride, a fluoride, a bromide, an iodide, an astatide, a sulfate, a tosylate, a mesylate, or a combination thereof.

In some embodiments, the amino acid comprises histidine, lysine, serine, glycine, proline, alanine, isoleucine, leucine, phenylalanine, tryptophan, tyrosine, valine, or combinations thereof.

In some embodiments, the amino acid is covalently bound to the starch-based cross-linked phenolic heteropolymer via a molecular linker. In some embodiments, the molecular linker is an alkyl chain of formula —CH$_3$—(CH$_2$)—CH$_2$— wherein n is an integer from 0 to 24 and wherein the alkyl chain is covalently bound to a plurality of pendent hydroxyl groups of formula —OH and a plurality of pendent carboxylic acid groups of formula —C(═O)OH on the starch-based cross-linked phenolic heteropolymer forming an alkoxy chain, an ester side chain, or a combination thereof. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values. In some embodiments, m and p are independently an integer from 2 to 6, 6 to 12, or 12 to 18, or 2 to 12. Specific examples of n include 1, 2, 3, 4, 5, 6, 7, 8, 9, 10, 11, 12, 13, 14, 15, 16, 17, 18, and ranges between any two of these values.

In some embodiments, the amino acid is a modified amino acid wherein at least one amine group is substituted with a quaternary amine of formula —NR$^2$MeX where R is a straight alkyl chain of formula —CH$_3$—(CH$_2$)$_n$—CH$_2$— wherein n is an integer from 0 to 24, Me is a methyl group, and wherein X is a counterion. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, the plurality of antimicrobial agents are covalently bound to the starch-based cross-linked phenolic heteropolymer by a polyethylene glycol chain of formula —[O—CH$_2$—CH$_2$]$_n$—O— where n is an integer from 2 to 24. In some embodiments, n is an integer from 0 to 6, 6 to 12, 12 to 18, 18 to 24, 0 to 12, or 0 to 18. Specific examples of n include 1, 2, 3, 4, 5, 6, 7, 8, 9, 10, 11, 12, 13, 14, 15, 16, 17, 18, 19, 20, 21, 22, 23, 24, and ranges between any two of these values.

In some embodiments, the plurality of sugar units is covalently bound to about 10% to about 90%, 10% to about 20%, 20% to about 30%, 10% to about 90%, about 30% to about 40%, about 40% to about 50%, 50% to about 60%, about 70% to about 80%, 80% to about 90%, about 10% to about 30%, about 10% to about 40%, about 10% to about 50%, about 10% to about 60%, about 10% to about 70%, or about 10% to about 80% of the combination of the plurality of pendent hydroxyl groups and the plurality of pendent carboxylic acid groups.

In some embodiments, the plurality of sugar units comprises at least one hexose sugar oligomer wherein multiple hexose sugar oligomers are linked together by either α-(1,4) or α-(1,6) glycosidic bonds. In some embodiments, the plurality of sugar units comprises at least one of α D-allose, α D-altrose, α D-mannose, α D-glucose, α D-gulose, a D-galactose, α D-idose, α D-talose, β D-allose, β D-altrose, β D-mannose, β D-glucose, β D-gulose, β D-galactose, β D-idose, β D-talose β-D-lactoside, α-L-flucoside, α-D-mannoside, or combinations thereof.

In some embodiments, the plurality of sugar units is covalently bound to the starch-based cross-linked phenolic heteropolymer via a molecular linker of formula: PH-PEG-T-CH$_2$—O—S wherein PH is the starch-based cross-linked phenolic heteropolymer, PEG is a polyethylene glycol chain of formula —[O—CH$_2$—CH$_2$]$_n$—O— where n is an integer from 2 to 24, T is a triazole ring, and S is the sugar unit.

In some embodiments, upon combination of the additive with a starch-based adhesive to form a modified starch-based adhesive, the modified starch-based adhesive has a water solubility of about 110% to about 200% of the same starch-based adhesive in the absence of the additive.

In some embodiments, upon combination of the additive with a starch-based adhesive to form a modified starch-based adhesive, the modified starch-based adhesive becomes more resistant than a sample of the starch-based adhesive in the absence of the additive to growth of at least one or more of the following: mold, fungus, bacteria, and combinations thereof.

In some embodiments, wherein upon combination of the additive with a starch-based adhesive to form a modified starch-based adhesive, and upon curing, the modified starch-based adhesive is more pliable, more resistant to chipping, more resistant to cracking, or more resistant to microbial growth than a cured sample of the starch-based adhesive in the absence of the additive.

In some embodiments, a water solvent carrier may be added, wherein a solids concentration of the modified starch-based adhesive in the water solvent carrier is greater than 25% w/v.

In some embodiments, the additive is combined with the starch-based adhesive in a ratio of about 1 to 2,000 to about 1 to 200,000 by weight. In some embodiments, both the additive and starch-based adhesive are in a dry form. In some embodiments, the additive is in dry form and the starch-based adhesive is a slurry. In some embodiments, the slurry comprises the starch-based adhesive and water.

In some embodiments, the additive is added to a powdered water-soluble adhesive prior to addition of water. The presence of the additive will increase the amount of powdered adhesive that can be dissolved in a particular amount of water and while retaining the adhesives desirable properties and providing antimicrobial properties to the cured adhesive.

In another embodiment, an additive is added to a powdered water-soluble adhesive after the addition of water, when the adhesive is in the liquid phase but prior to curing. The presence of the additive will increase the amount of powdered adhesive that can be dissolved in a particular amount of water while retaining the adhesives desirable properties and providing antimicrobial properties to the cured adhesive.

In another embodiment, an additive is added to water prior to the addition of a powdered water-soluble adhesive. The resulting mixture of additive and adhesive is in the liquid phase but prior to curing. The presence of the additive will increase the amount of powdered adhesive that can be dissolved in a particular amount of water while retaining the adhesives' desirable properties and providing antimicrobial properties to the cured adhesive. The various preparation methods can further comprise heating the mixture of additive, adhesive, and water. In certain embodiments, the heating step is applied as needed to ensure complete mixing of the additive and adhesive. The heating step can be performed at generally any temperature. Example temperatures and ranges can include 20° C.-50° C., 50° C.-75° C., and 20° C.-75° C. In some embodiments, temperature ranges will be lower than the boiling point of water. In some embodiments, temperature ranges will lower than temperatures that would result in the decomposition of organic solvents present. The heating step can be performed for generally any length of time. Example times and ranges can include 0-1 hours, 1-2 hours, 2-4 hours, 4-6 hours, and 1-6 hours. The heating step can be performed until complete mixing of the adhesive and additive is achieved. The various methods can further comprise cooling the mixture after the heating step. In yet other embodiments, the heating and cooling steps are accompanied by physical mixing of the additive and adhesive mixtures. In an additional embodiment, physical mixing of the additive and adhesive mixtures is performed in the absence of a heating or cooling step.

In yet another embodiment, the addition of an additive to an adhesive will increase the solids content of a particular adhesive water mixture to an amount above that which is achievable without the additive. For example, for British gums, the maximum usable solids content is about 25% in the absence of an additive, but would be increased in the presence of an additive so that the net amount of powdered adhesive that can be dissolved in water. Specific examples of the maximum usable solids content are expected to be 50-75% in the presence of the additive. In some embodiments, the desired solids content will depend of the intended use of the adhesive. One skilled in the art will be able to determine the optimal solids content of an adhesive-additive mixture to meet usage requirements. Generally, the higher the solids content, the thicker and more viscous the adhesive-additive mixture become, and the stronger the cured adhesive will be.

A further embodiment includes using an adhesive composition comprising the adhesive and an additive composition to adhere a material to another material or to itself where the cured adhesive is resistant to microbial colonization by fungi, mold, and bacteria. Examples of such material include wood, paper, textile, leather, plastic, or cardboard.

The methods can comprise providing at least one material, applying the adhesive compositions described herein to the material, and adhering the material. The method can further comprise curing the adhesive composition. In one embodiment, the method comprises adhering a first portion of a first material to a second portion of the same first material. In an alternative embodiment, the method comprises adhering a first material to a second material. In some embodiments, the method can comprise applying the adhesive composition to the first portion of the first material and the second portion of the first material prior to adhering the first portion and the second portion. In some embodiments, the method can comprise applying the adhesive composition to both the first material and the second material prior to adhering the first material to the second material.

The resistance to adverse factors such as microbial colonization by fungi, mold, and bacteria can be measured relative to the same cured adhesive prepared from a similar adhesive composition that lacks the additive composition. The percent resistance can generally be any percent resistance. Examples of percent resistance include at least about 10%, at least about 20%, at least about 30%, at least about 40%, at least about 50%, at least about 60%, at least about 70%, at least about 80%, at least about 90%, at least about 95%, at least about 96%, at least about 97%, at least about 98%, at least about 99%, and ranges between any two of these values. In an idealized embodiment, the percent resistance is 100%, that is, the cured adhesive is completely resistant to the adverse factor.

EXAMPLES

Example 1

Production of an Antimicrobial Starch-Based Cross-Linked Phenolic Heteropolymer Adhesive A starch-based cross-linked phenolic heteropolymer adhesive can be prepared using multistep coupling reactions. The starch-based cross-linked phenolic heteropolymer comprises a plurality of pendent hydroxyl groups of formula —OH and a plurality of pendent carboxylic acid groups of formula —C(=O)OH. In a first step, a starch-based cross-linked phenolic heteropolymer is dissolved in a non-protic polar solvent to form a dissolved starch-based cross-linked phenolic heteropolymer. In a second step, an azide terminated poly(ethylene glycol) and a plurality of hydroxyl-terminated quaternary ammonium salts having a structure of the formula HO-alkyl-$NR^1R^2R^3Cl$, wherein $R^1$-$R^3$ are alkyl chains, is contacted with the dissolved starch-based cross-linked phenolic heteropolymer to form an adhesive intermediate wherein the plurality of hydroxyl-terminated quaternary ammonium salts are covalently bound to the dissolved starch-based cross-linked phenolic heteropolymer. In a third step, a plurality of alkynylated α-D-mannoside alkynylated sugar units is contacted with the adhesive intermediate to form the adhesive wherein the plurality of α-D-mannoside alkynylated sugar units are covalently bound to the adhesive intermediate.

The first step includes adding dimethylformamide and pyridine to the starch-based cross-linked phenolic heteropolymer to form a dissolved starch-based cross-linked phenolic heteropolymer.

In the second step, an azide terminated poly(ethylene glycol) and a plurality of hydroxyl-terminated quaternary ammonium salts are contacted with the dissolved starch-based cross-linked phenolic heteropolymer to form an adhesive intermediate wherein the plurality of hydroxyl-terminated quaternary ammonium salts are covalently bound to the dissolved starch-based cross-linked phenolic heteropolymer. Contacting the azide terminated poly(ethylene glycol) and a plurality of hydroxyl-terminated quaternary ammonium salts with the dissolved starch-based cross-linked phenolic heteropolymer further comprises addition of the resin-bound organophosphorous compound polystyryldipehnylphosphine and the azodicarboxylate diethyl azodicarboxylate (DEAD).

Once the adhesive intermediate is formed, it is decanted from the polystyryldipehnylphosphine allowing the adhesive intermediate to dry to form a powder.

In a third step, a plurality of α-D-mannoside sugar units are contacted with the adhesive intermediate to form the adhesive wherein the plurality of sugar units are covalently bound to the adhesive intermediate. Contacting the plurality of α-D-mannoside sugar units with the adhesive intermediate to form the adhesive also includes the addition of a copper sulfate, sodium ascorbate, and a diluent made up of a mixture of water and an organic solvent at a ratio of about 1 to 1 by volume. Contacting the plurality of α-D-mannoside sugar units with the adhesive intermediate to form the adhesive is carried out at ambient temperature.

Example 2

Production of an Antimicrobial Modified Lignosulfonate-Based Adhesive

A modified lignosulfonate-based adhesive can be prepared using multistep coupling reactions. In a first step, lignosulfonate is dissolved in a non-protic polar solvent to form dissolved lignosulfonate. In a second step, an azide terminated poly(ethylene glycol) and a plurality hydroxyl-terminated quaternary ammonium salts having a structure of the formula HO-alkyl-$NR^1R^2R^3Cl$, wherein $R^1$-$R^3$ are alkyl chains, are contacted with the dissolved lignosulfonate to form an lignosulfonate-based adhesive intermediate wherein the plurality of hydroxyl-terminated quaternary ammonium salts are covalently bound to the dissolved lignosulfonate. In a third step, a plurality of α-D-mannoside sugar units is contacted with the lignosulfonate adhesive intermediate to form the modified lignosulfonate-based adhesive wherein the plurality of α-D-mannoside sugar units are covalently bound to the lignosulfonate-based adhesive intermediate.

The first step includes adding dimethylformamide and pyridine to the lignosulfonate to form dissolved lignosulfonate.

In the second step, an azide terminated poly(ethylene glycol) and a plurality of hydroxyl-terminated quaternary ammonium salts are contacted with the dissolved lignosulfonate to form an lignosulfonate-based adhesive intermediate wherein the plurality of hydroxyl-terminated quaternary ammonium salts are covalently bound to the dissolved lignosulfonate. Contacting the azide terminated poly(ethylene glycol) and a plurality of hydroxyl-terminated quaternary ammonium salts with the dissolved lignosulfonate further comprises addition of the resin-bound organophosphorous compound polystyryldipehnylphosphine and the azodicarboxylate diethyl azodicarboxylate (DEAD).

Once the lignosulfonate-based adhesive intermediate is formed, it is decanted from the polystyryldipehnylphosphine allowing the adhesive intermediate to dry to form a powder.

In a third step, a plurality of α-D-mannoside sugar units is contacted with the lignosulfonate-based adhesive intermediate to form the adhesive wherein the plurality of α-D-mannoside sugar units are covalently bound to the lignosulfonate-based adhesive intermediate. Contacting the plurality of α-D-mannoside sugar units with the lignosulfonate-based adhesive intermediate to form the adhesive also includes the addition of copper sulfate, sodium ascorbate, and a diluent consisting of a mixture of water and an organic solvent at a ratio of about 1 to 1 by volume. Contacting the plurality α-D-mannoside sugar units with the lignosulfonate-based adhesive intermediate to form the adhesive is carried out at ambient temperature.

Example 3

Production of an Antimicrobial Modified Lignin-Based Adhesive

A modified lignin-based adhesive can be prepared using multistep coupling reactions. In a first step, lignin is dissolved in a non-protic polar solvent to form dissolved lignin. In a second step, an azide terminated poly(ethylene glycol) and a plurality hydroxyl-terminated quaternary ammonium salts having a structure of the formula HO-alkyl-$NR^1R^2R^3Cl$, wherein $R^1$-$R^3$ are alkyl chains, are contacted with the dissolved lignin to form a lignin-based adhesive intermediate wherein the plurality of hydroxyl-terminated quaternary ammonium salts are covalently bound to the dissolved lignin. In a third step, a plurality of α-D-mannoside sugar units is contacted with the lignin adhesive intermediate to form the modified lignin-based adhesive wherein the plurality of α-D-mannoside sugar units are covalently bound to the lignin-based adhesive intermediate.

The first step includes adding dimethylformamide and pyridine to the lignin to form dissolved lignin.

In the second step, an azide terminated poly(ethylene glycol) and a plurality of hydroxyl-terminated quaternary ammonium salts are contacted with the dissolved lignin to form an lignin-based adhesive intermediate wherein the plurality of hydroxyl-terminated quaternary ammonium salts are covalently bound to the dissolved lignin. Contacting the azide terminated poly(ethylene glycol) and a plurality of hydroxyl-terminated quaternary ammonium salts with the dissolved lignin further comprises addition of the resin-bound organophosphorous compound polystyryldipehnylphosphine and the azodicarboxylate diethyl azodicarboxylate (DEAD).

Once the lignin-based adhesive intermediate is formed, it is decanted from the polystyryldipehnylphosphine allowing the adhesive intermediate to dry to form a powder.

In a third step, a plurality of α-D-mannoside sugar units is contacted with the lignin-based adhesive intermediate to form the adhesive wherein the plurality of α-D-mannoside sugar units are covalently bound to the lignin-based adhesive intermediate. Contacting the plurality of α-D-mannoside sugar units with the lignin-based adhesive intermediate to form the adhesive also includes the addition of copper sulfate, sodium ascorbate, and a diluent consisting of a mixture of water and an organic solvent at a ratio of about 1 to 1 by volume. Contacting the plurality α-D-mannoside sugar units with the lignin-based adhesive intermediate to form the adhesive is carried out at ambient temperature.

Example 4

Production of an Antimicrobial Modified Lignosulfonate-Based Adhesives Containing Modified Lysine Based Antimicrobial Agents A modified lignosulfonate-based adhesive can be prepared using multistep coupling reactions. In a first step, lysine is modified to form a quaternary ammonium containing lysine. In a second step, lignosulfonate is dissolved in a non-protic polar solvent to form dissolved lignosulfonate. In a third step, an azide terminated poly(ethylene glycol) and quaternary ammonium containing lysine are contacted with the dissolved lignosulfonate to form a lignosulfonate-based adhesive intermediate wherein the plurality of quaternary ammonium containing lysines are covalently bound to the dissolved lignosulfonate. In a fourth step, a plurality of α-D-mannoside sugar units is contacted with the lignosulfonate adhesive intermediate to form the modified lignosulfonate-based adhesive wherein the plurality of sugar units are covalently bound to the lignosulfonate-based adhesive intermediate.

Lysine may be modified to form quaternary ammonium containing lysine prior to being contacted with the dissolved lignosulfonate. Lysine can be modified by contacting lysine with dodecyl bromide to form an alkylated lysine intermediate; wherein at least one alkyl chain is covalently bound to the amino groups on the lysine. The alkyl chain can be a straight alkyl chain of formula —$CH_3$—$(CH_2)_n$—$CH_2$— wherein n is an integer from 0 to 24. The alkylated lysine is then contacted with the methylating agent dimethyl carbonate followed by mild acidic hydrolysis to form quaternary ammonium containing lysine wherein the quaternary ammonium group is of formula Lys-$NR_2MeCl$ where Lys is a lysine, R is a straight alkyl chain of formula —$CH_3$—$(CH_2)_n$—$CH_2$— wherein n is an integer from 0 to 16, and Me is a methyl group.

The second step includes adding dimethylformamide and pyridine to the lignin to form dissolved lignosulfonate.

In the third step, an azide terminated poly(ethylene glycol) and the quaternary ammonium containing lysine are contacted with the dissolved lignosulfonate to form a lignosulfonate-based adhesive intermediate wherein the quaternary ammonium containing lysine is covalently bound to the dissolved lignosulfonate. Contacting the azide terminated poly(ethylene glycol) and the quaternary ammonium containing lysine with the dissolved lignosulfonate further comprises addition of the resin-bound organophosphorous compound polystyryldipehnylphosphine and the azodicarboxylate diethyl azodicarboxylate (DEAD).

Once the lignosulfonate-based adhesive intermediate is formed, it is decanted from the polystyryldipehnylphosphine allowing the adhesive intermediate to dry to form a powder.

In a fourth step, a plurality of α-D-mannoside sugar units is contacted with the lignosulfonate-based adhesive intermediate to form the adhesive wherein the plurality of α-D-mannoside sugar units are covalently bound to the lignosulfonate-based adhesive intermediate. Contacting the plurality of α-D-mannoside sugar units with the lignosulfonate-based adhesive intermediate to form the adhesive also includes the addition of copper sulfate, sodium ascorbate, and a diluent comprising a mixture of water and an organic solvent at a ratio of about 1 to 1 by volume. Contacting the plurality of α-D-mannoside sugar units with the lignosulfonate-based adhesive intermediate to form the adhesive is carried out at ambient temperature.

Example 5

Production of an Antimicrobial Modified Lignosulfonate-Based Adhesives Containing Modified Pegylated Lysine Based Antimicrobial Agents A modified lignosulfonate-based adhesive can be prepared using multistep coupling reactions. In a first step, lignosulfonate is dissolved in a non-protic polar solvent to form dissolved lignosulfonate. In a second step, an azide terminated poly(ethylene glycol) and a plurality of hydroxyl-terminated lysine based antimicrobial agents are contacted with the dissolved lignosulfonate to form a lignosulfonate-based adhesive intermediate wherein the plurality of antimicrobial agents are covalently bound to the dissolved lignosulfonate. In a third step, a plurality of alkynylated sugar units is contacted with the lignosulfonate adhesive intermediate to form the modified lignosulfonate-based adhesive wherein the plurality of sugar units are covalently bound to the lignosulfonate-based adhesive intermediate.

Lysine can be modified to form a hydroxyl-terminated lysine based antimicrobial agent by contacting the amino acid with a plurality of polyethylene glycol chains of formula to form a pegylated lysine intermediate; wherein at least one alkyl chain is covalently bound to the amino groups on the lysine. The polyethylene glycol chain is of formula $CH_3$—$(CH_2)_m$—[O—$CH_2$—$CH_2$]$_n$—O—$(CH_2)_p$—CH3 where n is an integer from 2 to 24 and wherein m and p are independently an integer from 0 to 24. The pegylated lysine is then contacted with the methylating agent dimethyl carbonate followed by mild acidic hydrolysis to form a quaternary ammonium containing amino acid wherein the quaternary ammonium group is of formula Lys-$NR_2MeCl$ where Lys is Lysine, R is a polyethylene glycol chain of formula —$(CH_2)_m$—[O—$CH_2$—$CH_2$]$_n$—O—$(CH_2)_p$— wherein n is an integer from 0 to 16, m and p are independently an integer from 0 to 24, and Me is a methyl group.

The first step includes adding dimethylformamide and pyridine to the lignin to form dissolved lignosulfonate.

In the second step, an azide terminated poly(ethylene glycol) and a plurality of hydroxyl-terminated amino acid-based antimicrobial agents are contacted with the dissolved lignosulfonate to form a lignosulfonate-based adhesive intermediate wherein the plurality of antimicrobial agents are covalently bound to the dissolved lignosulfonate. Contacting the azide terminated poly(ethylene glycol) and a plurality of amino-acid based antimicrobial agents with the dissolved lignosulfonate further comprises addition of the resin-bound organophosphorous compound polystyryldipehnylphosphine and the azodicarboxylate diethyl azodicarboxylate (DEAD).

Once the lignosulfonate-based adhesive intermediate is formed, it is decanted from the polystyryldipehnylphosphine allowing the adhesive intermediate to dry to form a powder.

In a third step, a plurality of α-D-mannoside sugar units is contacted with the lignosulfonate-based adhesive intermediate to form the adhesive wherein the plurality of sugar units are covalently bound to the lignosulfonate-based adhesive intermediate. Contacting the plurality of α-D-mannoside sugar units with the lignosulfonate-based adhesive intermediate to form the adhesive also includes the addition of a copper sulfate, sodium ascorbate, and a diluent comprising a mixture of water and an organic solvent at a ratio of about 1 to 1 by volume. Contacting the plurality of α-D-mannoside sugar units with the lignosulfonate-based adhesive intermediate to form the adhesive is carried out at ambient temperature.

Example 6

Production of an Antimicrobial Starch-Based Cross-Linked Phenolic Heteropolymer Adhesive Additive A starch-based cross-linked phenolic heteropolymer adhesive additive can be prepared using multistep coupling reactions. The starch-based cross-linked phenolic heteropolymer comprises a plurality of pendent hydroxyl groups of formula —OH and a plurality of pendent carboxylic acid groups of formula —C(=O)OH. In a first step, a starch-based cross-linked phenolic heteropolymer is dissolved in a non-protic polar solvent to form a dissolved starch-based cross-linked phenolic heteropolymer. In a second step, an azide terminated poly(ethylene glycol) and a plurality of hydroxyl-terminated quaternary ammonium salts having a structure of the formula HO-alkyl-$NR^1R^2R^3Cl$, wherein $R^1$-$R^3$ are alkyl chains, is contacted with the dissolved starch-based cross-linked phenolic heteropolymer to form an adhesive additive intermediate wherein the plurality of hydroxyl-terminated quaternary ammonium salts is covalently bound to the dissolved starch-based cross-linked phenolic heteropolymer. In a third step, a plurality of α-D-mannoside sugar units is contacted with the adhesive additive intermediate to form the adhesive additive wherein the plurality of α-D-mannoside sugar units are covalently bound to the adhesive intermediate.

The first step includes adding dimethylformamide and pyridine to the starch-based cross-linked phenolic heteropolymer to form a dissolved starch-based cross-linked phenolic heteropolymer.

In the second step, an azide terminated poly(ethylene glycol) and a plurality of hydroxyl-terminated quaternary ammonium salts are contacted with the dissolved starch-based cross-linked phenolic heteropolymer to form an adhesive additive intermediate wherein the plurality of hydroxyl-terminated quaternary ammonium salts are covalently bound to the dissolved starch-based cross-linked phenolic heteropolymer. Contacting the azide terminated poly(ethylene glycol) and a plurality of hydroxyl-terminated quaternary ammonium salts with the dissolved starch-based cross-linked phenolic heteropolymer further comprises addition of the resin-bound organophosphorous compound polystyryldipehnylphosphine and the azodicarboxylate diethyl azodicarboxylate (DEAD).

Once the adhesive additive intermediate is formed, it is decanted from the polystyryldipehnylphosphine allowing the adhesive additive intermediate to dry to form a powder.

In a third step, a plurality of α-D-mannoside sugar units are contacted with the adhesive additive intermediate to form the adhesive additive wherein the plurality of sugar units are covalently bound to the adhesive additive intermediate. Contacting the plurality of alkynylated sugar units with the adhesive additive intermediate to form the adhesive additive also includes the addition of a copper sulfate, sodium ascorbate, and a diluent made up of a mixture of water and an organic solvent at a ratio of about 1 to 1 by volume. Contacting the plurality of α-D-mannoside alkynylated sugar units with the adhesive additive intermediate to form the adhesive is carried out at ambient temperature.

Example 7

Production of an Antimicrobial Modified Lignosulfonate-Based Adhesive Additive

A modified lignosulfonate-based adhesive additive can be prepared using multistep coupling reactions. In a first step, lignosulfonate is dissolved in a non-protic polar solvent to form dissolved lignosulfonate. In a second step, an azide terminated poly(ethylene glycol) and a plurality hydroxyl-terminated quaternary ammonium salts having a structure of the formula HO-alkyl-$NR^1R^2R^3Cl$, wherein $R^1$-$R^3$ are alkyl chains, are contacted with the dissolved lignosulfonate to form an lignosulfonate-based adhesive additive intermediate wherein the plurality of hydroxyl-terminated quaternary ammonium salts are covalently bound to the dissolved lignosulfonate. In a third step, a plurality of α-D-mannoside alkynylated sugar units is contacted with the lignosulfonate adhesive additive intermediate to form the modified lignosulfonate-based adhesive additive wherein the plurality of α-D-mannoside sugar units are covalently bound to the lignosulfonate-based adhesive additive intermediate.

The first step includes adding dimethylformamide and pyridine to the lignosulfonate to form dissolved lignosulfonate.

In the second step, an azide terminated poly(ethylene glycol) and a plurality of hydroxyl-terminated quaternary ammonium salts are contacted with the dissolved lignosulfonate to form an lignosulfonate-based adhesive additive intermediate wherein the plurality of hydroxyl-terminated quaternary ammonium salts are covalently bound to the dissolved lignosulfonate. Contacting the azide terminated poly (ethylene glycol) and a plurality of hydroxyl-terminated quaternary ammonium salts with the dissolved lignosulfonate further comprises addition of the resin-bound organophosphorous compound polystyryldipehnylphosphine and the azodicarboxylate diethyl azodicarboxylate (DEAD).

Once the lignosulfonate-based adhesive additive intermediate is formed, it is decanted from the polystyryldipehnylphosphine allowing the adhesive additive intermediate to dry to form a powder.

In a third step, a plurality of α-D-mannoside sugar units is contacted with the lignosulfonate-based adhesive additive intermediate to form the adhesive additive wherein the plurality of α-D-mannoside sugar units are covalently bound to the lignosulfonate-based adhesive additive intermediate. Contacting the plurality of α-D-mannoside sugar units with the lignosulfonate-based adhesive additive intermediate to form the adhesive also includes the addition of copper sulfate, sodium ascorbate, and a diluent consisting of a mixture of water and an organic solvent at a ratio of about 1 to 1 by volume. Contacting the plurality α-D-mannoside sugar units with the lignosulfonate-based adhesive additive intermediate to form the adhesive additive is carried out at ambient temperature.

Example 8

Production of an Antimicrobial Modified Lignin-Based Adhesive Additive

A modified lignin-based adhesive additive can be prepared using multistep coupling reactions. In a first step, lignin is dissolved in a non-protic polar solvent to form dissolved lignin. In a second step, an azide terminated poly(ethylene glycol) and a plurality hydroxyl-terminated quaternary ammonium salts having a structure of the formula HO-alkyl-$NR^1R^2R^3Cl$, wherein $R^1$-$R^3$ are alkyl chains, are contacted with the dissolved lignin to form an lignin-based adhesive additive intermediate wherein the plurality of hydroxyl-terminated quaternary ammonium salts are covalently bound to the dissolved lignin. In a third step, a plurality of α-D-mannoside alkynylated sugar units is contacted with the lignin adhesive additive intermediate to form the modified lignin-based adhesive additive wherein the plurality of α-D-mannoside sugar units are covalently bound to the lignin-based adhesive additive intermediate.

The first step includes adding dimethylformamide and pyridine to the lignin to form dissolved lignin.

In the second step, an azide terminated poly(ethylene glycol) and a plurality of hydroxyl-terminated quaternary ammonium salts are contacted with the dissolved lignin to form an lignin-based adhesive additive intermediate wherein the plurality of hydroxyl-terminated quaternary ammonium salts are covalently bound to the dissolved lignin. Contacting the azide terminated poly(ethylene glycol) and a plurality of hydroxyl-terminated quaternary ammonium salts with the dissolved lignin further comprises addition of the resin-bound organophosphorous compound polystyryldipehnylphosphine and the azodicarboxylate diethyl azodicarboxylate (DEAD).

Once the lignin-based adhesive additive intermediate is formed, it is decanted from the polystyryldipehnylphosphine allowing the adhesive additive intermediate to dry to form a powder.

In a third step, a plurality of α-D-mannoside sugar units is contacted with the lignin-based adhesive additive intermediate to form the adhesive additive wherein the plurality of α-D-mannoside sugar units are covalently bound to the lignin-based adhesive additive intermediate. Contacting the plurality of α-D-mannoside sugar units with the lignin-based adhesive additive intermediate to form the adhesive also includes the addition of copper sulfate, sodium ascorbate, and a diluent comprising a mixture of water and an organic solvent at a ratio of about 1 to 1 by volume. Contacting the plurality α-D-mannoside sugar units with the lignin-based adhesive additive intermediate to form the adhesive additive is carried out at ambient temperature Example 9

Production of an Antimicrobial Modified Lignosulfonate-Based Adhesive Additives Containing Modified Lysine Based Antimicrobial Agents A modified lignosulfonate-based adhesive additive can be prepared using multistep coupling reactions. In a first step, lysine is modified to form a quaternary ammonium containing lysine. In a second step, lignosulfonate is dissolved in a non-protic polar solvent to form dissolved lignosulfonate. In a third step, an azide terminated poly(ethylene glycol) and quaternary ammonium containing lysine are contacted with the dissolved lignosulfonate to form a lignosulfonate-based adhesive additive intermediate wherein the plurality of quaternary ammonium containing lysines are covalently bound to the dissolved lignosulfonate. In a fourth step, a plurality of α-D-mannoside sugar units is contacted with the lignosulfonate adhesive additive intermediate to form the modified lignosulfonate-based adhesive additive wherein the plurality of sugar units are covalently bound to the lignosulfonate-based adhesive additive intermediate.

Lysine may be modified to form quaternary ammonium containing lysine prior to being contacted with the dissolved lignosulfonate. Lysine can be modified by contacting lysine with dodecyl bromide to form an alkylated lysine intermediate; wherein at least one alkyl chain is covalently bound to the amino groups on the lysine. The alkyl chain can be a straight alkyl chain of formula —$CH_3$—$(CH_2)_n$—$CH_2$—wherein n is an integer from 0 to 24. The alkylated lysine is then contacted with the methylating agent dimethyl carbonate followed by mild acidic hydrolysis to form quaternary ammonium containing lysine wherein the quaternary ammonium group is of formula Lys-$NR_2MeCl$ where Lys is a lysine, R is a straight alkyl chain of formula —$CH_3$—$(CH_2)_n$—$CH_2$—wherein n is an integer from 0 to 16, and Me is a methyl group.

The second step includes adding dimethylformamide and pyridine to the lignin to form dissolved lignosulfonate.

In the third step, an azide terminated poly(ethylene glycol) and the quaternary ammonium containing lysine are contacted with the dissolved lignosulfonate to form a lignosulfonate-based adhesive additive intermediate wherein the quaternary ammonium containing lysine is covalently bound to the dissolved lignosulfonate. Contacting the azide terminated poly(ethylene glycol) and the quaternary ammonium containing lysine with the dissolved lignosulfonate further comprises addition of the resin-bound organophosphorous compound polystyryldipehnylphosphine and the azodicarboxylate diethyl azodicarboxylate (DEAD).

Once the lignosulfonate-based adhesive additive intermediate is formed, it is decanted from the polystyryldipehnylphosphine allowing the adhesive additive intermediate to dry to form a powder.

In a fourth step, a plurality of α-D-mannoside sugar units is contacted with the lignosulfonate-based adhesive additive intermediate to form the adhesive additive wherein the plurality of α-D-mannoside sugar units are covalently bound to the lignosulfonate-based adhesive additive intermediate. Contacting the plurality of α-D-mannoside sugar units with the lignosulfonate-based adhesive additive intermediate to form the adhesive additive also includes the addition of copper sulfate, sodium ascorbate, and a diluent comprising a mixture of water and an organic solvent at a ratio of about 1 to 1 by volume. Contacting the plurality of α-D-mannoside sugar units with the lignosulfonate-based adhesive additive intermediate to form the adhesive additive is carried out at ambient temperature.

Example 10

Production of an Antimicrobial Modified Lignosulfonate-Based Adhesives Containing Modified Pegylated Lysine Based Antimicrobial Agents A modified lignosulfonate-based adhesive additive can be prepared using multistep coupling reactions. In a first step, lignosulfonate is dissolved in a non-protic polar solvent to form dissolved lignosulfonate. In a second step, an azide terminated poly(ethylene glycol) and a plurality of hydroxyl-terminated lysine based antimicrobial agents are contacted with the dissolved lignosulfonate to form a lignosulfonate-based adhesive additive intermediate wherein the plurality of antimicrobial agents are covalently bound to the dissolved lignosulfonate. In a third step, a plurality of alkynylated sugar units is contacted with the lignosulfonate adhesive additive intermediate to form the modified lignosulfonate-based adhesive additive wherein the plurality of sugar units are covalently bound to the lignosulfonate-based adhesive additive intermediate.

Lysine can be modified to form a hydroxyl-terminated lysine based antimicrobial agent by contacting the amino acid with a plurality of polyethylene glycol chains of formula to form a pegylated lysine intermediate; wherein at least one alkyl chain is covalently bound to the amino groups on the lysine. The polyethylene glycol chain is of formula $CH_3$—$(CH_2)_m$—[O—$CH_2$—$CH_2$]$_n$—O—$(CH_2)_p$—CH3 where n is an integer from 2 to 24 and wherein m and p are independently an integer from 0 to 24. The pegylated lysine is then contacted with the methylating agent dimethyl carbonate followed by mild acidic hydrolysis to form a quaternary ammonium containing amino acid wherein the quaternary ammonium group is of formula Lys-$NR_2$MeCl where Lys is Lysine, R is a polyethylene glycol chain of formula —$(CH_2)_m$—[O—$CH_2$—$CH_2$]$_n$—O—$(CH_2)_p$— wherein n is an integer from 0 to 16, m and p are independently an integer from 0 to 24, and Me is a methyl group.

The first step includes adding dimethylformamide and pyridine to the lignin to form dissolved lignosulfonate.

In the second step, an azide terminated poly(ethylene glycol) and a plurality of hydroxyl-terminated amino acid-based antimicrobial agents are contacted with the dissolved lignosulfonate to form a lignosulfonate-based adhesive additive intermediate wherein the plurality of antimicrobial agents are covalently bound to the dissolved lignosulfonate. Contacting the azide terminated poly(ethylene glycol) and a plurality of amino-acid based antimicrobial agents with the dissolved lignosulfonate further comprises addition of the resin-bound organophosphorous compound polystyryldipehnylphosphine and the azodicarboxylate diethyl azodicarboxylate (DEAD).

Once the lignosulfonate-based adhesive additive intermediate is formed, it is decanted from the polystyryldipehnylphosphine allowing the adhesive additive intermediate to dry to form a powder.

In a third step, a plurality of α-D-mannoside sugar units is contacted with the lignosulfonate-based adhesive additive intermediate to form the adhesive additive wherein the plurality of sugar units are covalently bound to the lignosulfonate-based adhesive additive intermediate. Contacting the plurality of α-D-mannoside sugar units with the lignosulfonate-based adhesive additive intermediate to form the adhesive additive also includes the addition of a copper sulfate, sodium ascorbate, and a diluent comprising a mixture of water and an organic solvent at a ratio of about 1 to 1 by volume. Contacting the plurality of α-D-mannoside sugar units with the lignosulfonate-based adhesive additive intermediate to form the adhesive additive is carried out at ambient temperature.

Example 11

Preparation and Use of an Adhesive

The additive powder prepared as described in Examples 6 through 10 (0.5 mg) can be added to dry white dextrin (100 g), and water (1 L) can be added to this mixture to create an adhesive mixture.

Example 12

Preparation and Use of an Adhesive

The additive powder prepared as described in Examples 6 through 10 (500 mg) can be added to a slurry including white dextrin (100 g) in water (1 L) to create an adhesive mixture.

Example 13

Preparation and Use of an Adhesive

The additive powder prepared as described in Examples 6 through 10 (500 mg) can be added to water (1 L) followed by addition of white dextrin (100 g) in water (1 L) to create an adhesive mixture.

Example 14

Preparation and Use of an Adhesive

The additive powder prepared as described in Examples 6 through 10 (100 mg) can be added to dry white dextrin (1000 g), and water (1 L) can be added to this mixture to create an adhesive mixture.

Example 15

Preparation and Use of an Adhesive

The additive powder prepared as described in Examples 6 through 10 (100 mg) can be added to a slurry including white dextrin (1000 g) in water (1 L) to create an adhesive mixture.

Example 16

Preparation and Use of an Adhesive

The additive powder prepared as described in Examples 6 through 10 (100 mg) can be added to water (1 L) followed by addition of white dextrin (1000 g) in water (1 L) to create an adhesive mixture.

Example 17

Preparation and Use of an Adhesive

In some embodiments, the mixture of water, adhesive and additive are mixed in cold water for about 30 minutes. In yet other embodiments, the mixture of water, adhesive and additive is mixed and heated to a temperature exceeding 20° C. and subsequently cooled prior to curing.

Example 18

Use of an Adhesive-Additive Mixture in the Manufacture of Corrugated Cardboard Boxes The adhesives prepared as described in examples 11 through 17 can be used in the manufacture of corrugated cardboard blanks for use in making cardboard boxes. Corrugated cardboard blanks are produced in a continuous two-step operation consisting of corrugating a strip of cardboard by means of heated fluted rolls, applying one of the adhesives in examples 11 through 17 to the tips of the corrugations on one side, bringing a smooth cardboard liner in contact with the corrugations and forming a bond by providing pressure sufficient to hold the liner and corrugated paper in contact to form a single faced corrugated cardboard. In a second step, one of the adhesive of examples 11 through 17 is applied to the tips of the corrugated cardboard that remain exposed followed by contacting the exposed corrugated tips to a second smooth cardboard liner and forming an adhesive bond by providing pressure sufficient to hold the liner and corrugated paper in contact. The result of this two-step process is a stiff cardboard comprising two smooth outer cardboard surfaces bonded to an inner core of corrugated cardboard. The double-faced corrugated cardboard blank produced by this process can be used to form boxes whereby the stiff corrugated cardboard is folded over and adhered to another portion of the same stiff corrugated cardboard comprising a first, second, third, and fourth side wall panel, wherein the first and third side wall panels are in opposed relationship, and wherein the second and fourth side wall panels are in opposed relationship, the side wall panels defining an interior space of the box. The adhesives in examples 11 through 17 can also be utilized to adhere portions of a cardboard box to one another. In some embodiments this can be achieved by the application of sufficient pressure so as to maintain portions of the folded cardboard blank in contact unless a bond is formed and adhesive has cured.

In some embodiments, the cardboard blank is produced as described above with the additional step of applying heat in conjunction with sufficient pressure to hold the liner and corrugated paper in place.

The resulting cardboard box benefits from the added features of the adhesive containing an additive. The features include greater strength and resistance to microbial colonization on areas where adhesive is present.

Example 19

Use of an Adhesive-Additive Mixture in the Manufacture of Textile Products

The adhesives prepared as described in examples 11 through 17 can be used in the manufacture of textile products. Examples include clothing garments, household items such as carpets and rugs, towels, curtains and sheets, furniture and automotive upholstery, and industrial belts and fire hoses. Textile products can be produced by the adhesion of separate pieces of non-woven fabric or by the adhesion of a portion of a piece of fabric to another portion of the same piece of fabric. Examples of non-woven fabrics include spunlace, spunbond, and blends of polyester, polypropylene, and/or polyethylene, as well as combinations thereof. The adhesive described in examples 11 through 17 can be used to adhere single or separate pieces of non-woven fabrics by a process of contacting the adhesive to the surface of fabric followed by contacting a second surface of either the same piece of textile or a separate piece of textile and applying sufficient pressure to hold the pieces of fabric in contact while the adhesive cures. The result of this process is two pieces of fabric bonded together with sufficient strength to withstand the stress of the products intended usage as well as resistance to colonization by microbial organisms at the sight of the bond.

In some embodiments, the textile product can be made as described above with the additional step of applying heat in conjunction with sufficient pressure to hold the pieces of textile in place.

Example 20

Testing the Properties of an Adhesive

The properties of a particular adhesive, adhesive additive, or adhesive-additive mixture can be established and compared with those of other adhesives or the same adhesives in the absence of an adhesive additive by a number of standard testing methodologies including peel, tension, compression, and shear tests. These tests measure the strength of a cured adhesive and its ability to withstand a variety of stresses that can be encountered in its use. A peel test will measure the force required to separate to two adhered substrates, for example two pieces or fabric or two pieces of cardboard, in terms of the force, angle, and time required to achieve separation of the adhesive from the substrates. A peel test will provide an indication of the level of stress required before a particular adhesive fails and separates from a substrate. Tension, compression, and shear tests allow for the characterization of adhesion provided by a particular adhesive and the forces required to cause separation of the adhesive from a substrate or separation of two substrates adhered together. These tests will permit a user to evaluate the differences in strength of an adhesive with and without an additive.

Example 21

Comparison of an Adhesive-Additive Mixture Against an Adhesive Lacking an Additive The properties of a particular adhesive-additive mixture can be compared with those of adhesives in the absence of an additive by a number of standard testing methodologies including peel, tension, compression, and shear tests. These tests measure the strength of a cured adhesive and its ability to withstand a variety of stresses that can be encountered in its use. A peel test will measure the force required to separate to two adhered substrates, for example two pieces or fabric or two pieces of cardboard, in terms of the force, angle and time required to achieve separation of the adhesive from the substrates. A peel test will provide an indication of the level of stress required before a particular adhesive fails and separates from a substrate. Tension, compression, and shear tests allow for the characterization of adhesion provided by a particular adhesive and the forces required to cause separation of the adhesive from a substrate or separation of two substrates adhered together. These tests will permit a user to evaluate the differences in strength of an adhesive with and without an additive.

In addition, tests can be performed to analyze the characteristics of the adhesive in the presence of an additive while the adhesive is in the liquid stage. Such tests may measure viscosity and solubility of the adhesive. The ability of an adhesive additive to increase viscosity of an adhesive in the liquid phase can be measured by observing the rate of flow of a sample of an adhesive from one container to another positioned below the first container such that adhesive will flow in a constant stream under the force of gravity. The viscosity of an adhesive containing an additive can be compared directly to the same adhesive in the absence of an additive while both adhesives are in the liquid phase. More sophisticated measurement devices exist to obtain a quantitative comparison of the viscosity of an adhesive in the liquid phase. These include falling and oscillatory piston viscometers and Stabinger and Stormert rotational viscometers, which can be used if a particular liquid-phase adhesive is characterized a Newtonian fluid. Where the adhesive in liquid phase represents a non-Newtonian fluid, instruments including rheometers and plastometers can be used to measure viscosity of a particular adhesive.

Increased resistance of an adhesive preparation to attack by bacteria, yeast, and fungi can be measured by exposing a sterile adhesive to selected microbes and monitoring the adhesives return to sterility. In addition, the presence of microbes on the surface or within a particular adhesive can be monitored by contacting the adhesive with a letheen agar plate and monitoring microbe growth on the agar plate. This can be done after specifically infecting the adhesive with a selected microbe or contacting the adhesive with the letheen agar plate after exposure to conditions that would simulate the additives use. These methods would allow for testing of adhesives with and without additives in both the liquid phase and after curing.

Additional tests can be performed to measure the performance of an adhesive containing an additive compared with the same adhesive in the absence of an additive. Such tests might include exposure of the cured adhesive to a range of temperatures and pressures to mimic the conditions in which the adhesive would be used. Another characteristic that can be readily measured is the performance of an adhesive containing an additive after varying amounts of exposure to sunlight. These conditions can be replicated under laboratory conditions by exposing the cured adhesive to varying amounts of ultraviolet light for a variety of durations and then performing the tests described above. As with the tests described above, the potential benefit of an additive to a particular feature of an adhesive can be quantified by comparing the adhesive in the presence of an additive to the same adhesive in the absence of the additive.

Solubility of a water-based adhesive is an important feature that can be enhanced in the presence of an additive. To measure solubility of an adhesive powder in water, light or laser refraction can be used to measure the presence of particles of un-dissolved adhesive. A specified amount of adhesive can be added to a measured amount of water and the relative light or laser refraction can be measured as a surrogate for solubility of the powdered adhesive. This method permits the comparison of the solubility of a particular adhesive in the presence or absence of an additive. An alternative method for measuring the solubility of measured amounts of an adhesive with and without an additive is to measure adhesive sedimentation after application of a mild centrifugal force to the adhesive-water mixture. It is expected that higher levels of sedimentation are correlated with lower levels of solubility of the adhesive.

What is claimed is:

1. A composition comprising:
a starch-based cross-linked phenolic heteropolymer;
a plurality of antimicrobial agents covalently bound to the starch-based cross-linked phenolic heteropolymer; and
a plurality of sugar units covalently bound to the starch-based cross-linked phenolic heteropolymer.

2. The composition of claim 1, wherein the starch-based cross-linked phenolic heteropolymer is a sulfonated starch-based cross-linked phenolic heteropolymer.

3. The composition of claim 1, wherein the starch-based cross-linked phenolic heteropolymer is selected from lignin, cellulose, hemicellulose, dextrin, a wood-derived cross-linked phenolic heteropolymer, or a combination thereof.

4. The composition of claim 1, wherein the starch-based cross-linked phenolic heteropolymer comprises a plurality of pendent hydroxyl groups of formula —OH and a plurality of pendent carboxylic acid groups of formula —C(═O)OH and wherein the plurality of antimicrobial agents is covalently bound to about 1% to about 50% of the combination of the plurality of pendent hydroxyl groups and the plurality of pendent carboxylic acid groups.

5. The composition of claim 1, wherein the plurality of antimicrobial agents comprises at least one of a phenol, a quaternary ammonium salt, 4-hydroxybenzoic acid, a hydroxytyrosol, an alkyl ester of gallic acid, an amino acid, a peptide, or combinations thereof.

6. The composition of claim 1, wherein the starch-based cross-linked phenolic heteropolymer comprises a plurality of pendent hydroxyl groups of formula —OH and a plurality of pendent carboxylic acid groups of formula —C(═O)OH and wherein the plurality of sugar units is covalently bound to about 10% to about 90% of the combination of the plurality of pendent hydroxyl groups and the plurality of pendent carboxylic acid groups.

7. The composition of claim 1, wherein the plurality of sugar units comprises at least one hexose sugar oligomer wherein multiple hexose sugar oligomers are linked together by either α-(1,4) or α-(1,6) glycosidic bonds.

8. The composition of claim 2, wherein the sulfonated starch-based cross-linked phenolic heteropolymer is selected from sulfonated lignin, sulfonated cellulose, sulfonated hemicellulose, sulfonated dextrin, a sulfonated wood-derived cross-linked phenolic heteropolymer, or a combination thereof.

9. The composition of claim 5, wherein the plurality of antimicrobial agents comprise a quaternary ammonium salt having a structure of the formula —O-alkyl-NR$^1$R$^2$R$^3$X, wherein R$^1$-R$^3$ are alkyl chains, and wherein X is a counterion.

10. The composition of claim 5, wherein the counterion comprises a chloride, a fluoride, a bromide, an iodide, an astatide, a sulfate, a tosylate, a mesylate, or a combination thereof.

11. The composition of claim 5, wherein the amino acid comprises histidine, lysine, serine, glycine, proline, alanine, isoleucine, leucine, phenylalanine, tryptophan, tyrosine, valine, or combinations thereof.

12. The composition of claim 11, wherein the amino acid is covalently bound to the starch-based cross-linked phenolic heteropolymer via a molecular linker.

13. The composition of claim 12, wherein the molecular linker is an alkyl chain of formula CH$_3$—(CH$_2$)$_n$—CH$_2$— wherein n is an integer from 0 to 24 and wherein the alkyl chain is covalently bound to a plurality of pendent hydroxyl groups of formula —OH and a plurality of pendent carboxylic acid groups of formula —C(=O)OH on the starch-based cross-linked phenolic heteropolymer forming an alkoxy chain, an ester side chain or a combination thereof.

14. The composition of claim 13, wherein the alkyl chain is a dodecyl straight alkyl chain.

15. The composition of claim 12, wherein the molecular linker is a polyethylene glycol chain formula —[O—CH$_2$—CH$_2$]$_n$—O— where n is an integer from 2 to 24.

16. The composition of claim 5, wherein the amino acid is a modified amino acid wherein at least one amine group is substituted with a quaternary amine of formula —NRMeX where R is an straight alkyl chain of formula CH$_3$—(CH$_2$)$_n$—CH$_2$— wherein n is an integer from 0 to 124, Me is a methyl group, and wherein X is a counterion.

17. The composition of claim 1, wherein the plurality of antimicrobial agents are covalently bound to the starch-based cross-linked phenolic heteropolymer by a polyethylene glycol chain of formula —[O—CH$_2$—CH$_2$]$_n$—O— where n is an integer from 2 to 18.

18. The composition of claim 1, wherein the plurality of sugar units comprises at least one of α D-allose, α D-altrose, α D-mannose, α D-glucose, α D-gulose, α D-galactose, α D-idose, α D-talose, β D-allose, β D-altrose, β D-mannose, β D-glucose, β D-gulose, β D-galactose, β D-idose, β D-talose β-D-lactoside, α-L-flucoside, α-D-mannoside, or combinations thereof.

19. The composition of claim 1, wherein the plurality of sugar units is covalently bound to the starch-based cross-linked phenolic heteropolymer via a polyethylene glycol chain of formula —[O—CH$_2$—CH$_2$]$_n$—O— where n is an integer from 2 to 24.

20. The composition of claim 1, wherein the composition is suitable for use as a pressure sensitive adhesive.

21. The composition of claim 1, wherein the composition is suitable for use as an adhesive additive.

22. The composition of claim 1, wherein the starch-based cross-linked phenolic heteropolymer is selected from lignin, sulfonated lignin or a combination thereof.

23. The composition of claim 1, wherein the starch-based cross-linked phenolic heteropolymer comprises a plurality of pendent hydroxyl groups of formula —OH and a plurality of pendent carboxylic acid groups of formula —C(=O)OH and wherein the plurality of antimicrobial agents is covalently bound to about 1% to about 5% of the combination of the plurality of pendent hydroxyl groups and the plurality of pendent carboxylic acid groups.

24. The composition of claim 1, wherein the starch-based cross-linked phenolic heteropolymer comprises a plurality of pendent hydroxyl groups of formula —OH and a plurality of pendent carboxylic acid groups of formula —C(=O)OH and wherein the plurality of antimicrobial agents is covalently bound to about 5% to about 10% of the combination of the plurality of pendent hydroxyl groups and the plurality of pendent carboxylic acid groups.

* * * * *

UNITED STATES PATENT AND TRADEMARK OFFICE
CERTIFICATE OF CORRECTION

PATENT NO. : 9,057,007 B2
APPLICATION NO. : 13/819889
DATED : June 16, 2015
INVENTOR(S) : Brizius It is certified that error appears in the above-identified patent and that said Letters Patent is hereby corrected as shown below:

In the specification

In Column 10, Line 16, delete "$CH_3\text{-}(CH_2)n\text{-}CH_2\text{-}$" and insert -- $CH_3\text{-}(CH_2)_n\text{-}CH_2\text{-}$ --, therefor.

In Column 17, Lines 27-28, delete "a D-galactose," and insert -- α D-galactose, --, therefor.

Signed and Sealed this
Fifth Day of April, 2016

Michelle K. Lee
*Director of the United States Patent and Trademark Office*